(12) United States Patent
Inaba et al.

(10) Patent No.: US 8,363,123 B2
(45) Date of Patent: Jan. 29, 2013

(54) IMAGE PICKUP APPARATUS, COLOR NOISE REDUCTION METHOD, AND COLOR NOISE REDUCTION PROGRAM

(75) Inventors: Seijiro Inaba, Kanagawa (JP); Takuya Chiba, Tokyo (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 12/273,136

(22) Filed: Nov. 18, 2008

(65) Prior Publication Data
US 2009/0160992 A1 Jun. 25, 2009

(30) Foreign Application Priority Data
Dec. 21, 2007 (JP) ................................. 2007-330509

(51) Int. Cl.
*G06K 9/32* (2006.01)
*G06K 9/40* (2006.01)
*H04N 5/335* (2011.01)

(52) U.S. Cl. ...................... 348/222.1; 348/272; 382/260; 382/300

(58) Field of Classification Search .................. None
See application file for complete search history.

(56) References Cited

U.S. PATENT DOCUMENTS

| | | | | |
|---|---|---|---|---|
| 6,091,862 | A * | 7/2000 | Okisu | 382/300 |
| 7,016,549 | B1 * | 3/2006 | Utagawa | 382/261 |
| 2002/0163583 | A1 * | 11/2002 | Jones | 348/272 |
| 2002/0167602 | A1 * | 11/2002 | Nguyen | 348/280 |
| 2003/0052981 | A1 * | 3/2003 | Kakarala et al. | 348/272 |
| 2003/0231251 | A1 * | 12/2003 | Tsukioka | 348/272 |
| 2004/0085458 | A1 * | 5/2004 | Yanof et al. | 348/223.1 |
| 2004/0183919 | A1 * | 9/2004 | Yamamoto | 348/222.1 |
| 2005/0001907 | A1 * | 1/2005 | Hoshuyama | 348/222.1 |

(Continued)

FOREIGN PATENT DOCUMENTS

| | | |
|---|---|---|
| JP | 2001-61157 | 3/2001 |
| JP | 2003-163939 | 6/2003 |

(Continued)

OTHER PUBLICATIONS

Wang Tao, "Research on Hybrid Demosaic Approach for Color Image", Master's Thesis of Nanjing University of Science and Technology, Feb. 2007, 22 Pages with English translation.

(Continued)

*Primary Examiner* — Chieh M Fan
*Assistant Examiner* — Dwight C Tejano
(74) *Attorney, Agent, or Firm* — Oblon, Spivak, McClelland, Maier & Neustadt, L.L.P.

(57) ABSTRACT

An image pickup apparatus includes an image sensor including a color filter having pixels of different colors arranged in a predetermined order and a demosaic processor. The image sensor receives a subject image and outputs an image signal including color signals of the different colors. The demosaic processor generates color signals of the different colors for each of pixels of the image from the image signal. The demosaic processor includes a generation unit and a noise reduction unit. The generation unit performs computation using a target color signal representing a predetermined target color signal included in the image signal and a predetermined different color signal so as to generate a color-related signal that associates the target color signal with the predetermined different color signal for a pixel of the target color signal. The noise reduction unit performs a noise reduction process on the color-related signal generated by the generation unit.

12 Claims, 28 Drawing Sheets

U.S. PATENT DOCUMENTS

2005/0073592 A1* 4/2005 Aotsuka .................... 348/224.1
2005/0094007 A1* 5/2005 Nomura et al. ............... 348/272

FOREIGN PATENT DOCUMENTS

| | | |
|---|---|---|
| JP | 2004-221838 | 8/2004 |
| JP | 2005-311455 | 11/2005 |
| WO | WO 2004/112401 | 12/2004 |

OTHER PUBLICATIONS

Office Action issued in Japanese Application No. 2007-330509 mailed on Apr. 17, 2012.

* cited by examiner

FIG. 4A
RAW DATA IN BAYER ARRANGEMENT
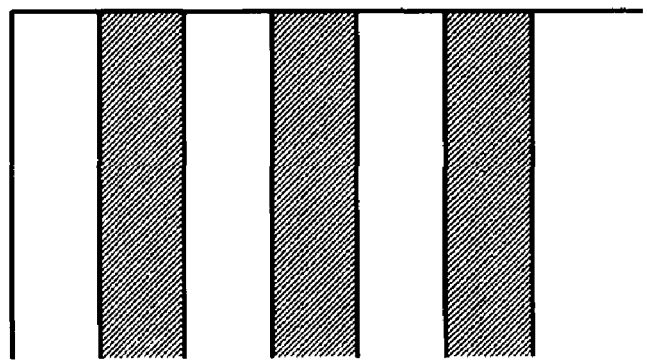
FIG. 4B
IMAGE
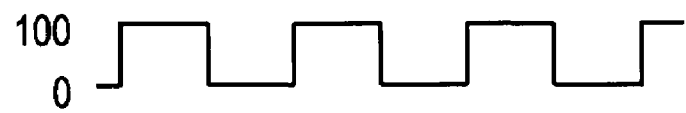
FIG. 4C
G SIGNAL
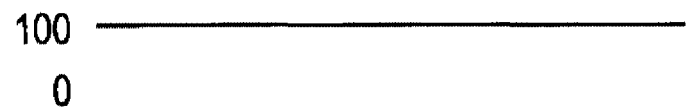
FIG. 4D
INTERPOLATED R SIGNAL
FIG. 4E
INTERPOLATED B SIGNAL FIG. 5A
RAW DATA IN
BAYER ARRANGEMENT
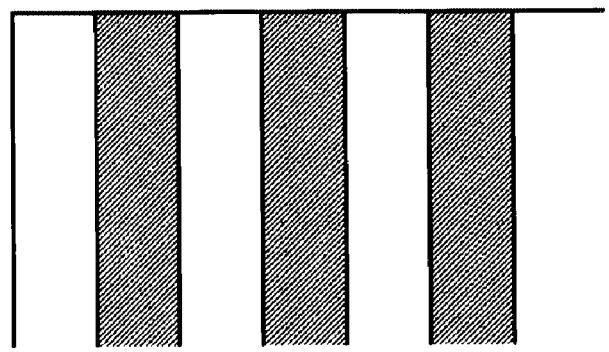
FIG. 5B
IMAGE
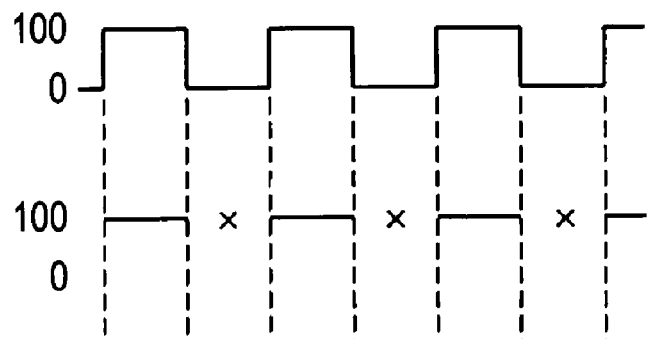
FIG. 5C
G SIGNAL
FIG. 5D
R SIGNAL
FIG. 5E
(R−G) SIGNAL
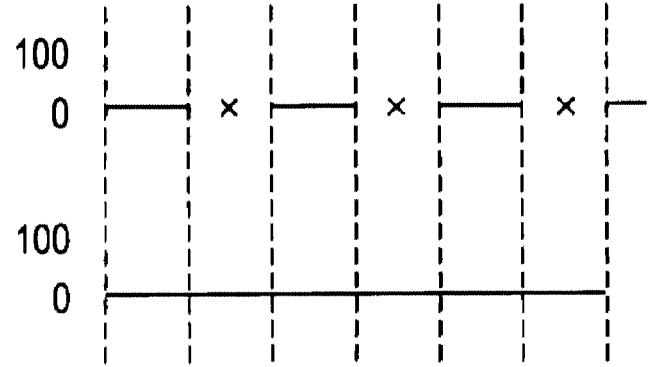
FIG. 5F
INTERPOLATED
(R−G) SIGNAL
FIG. 5G
R SIGNAL GENERATED BY
ADDING BACK G SIGNAL
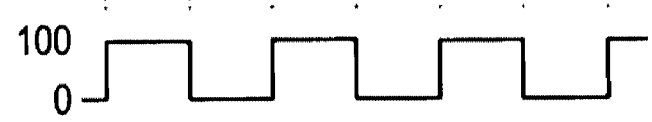

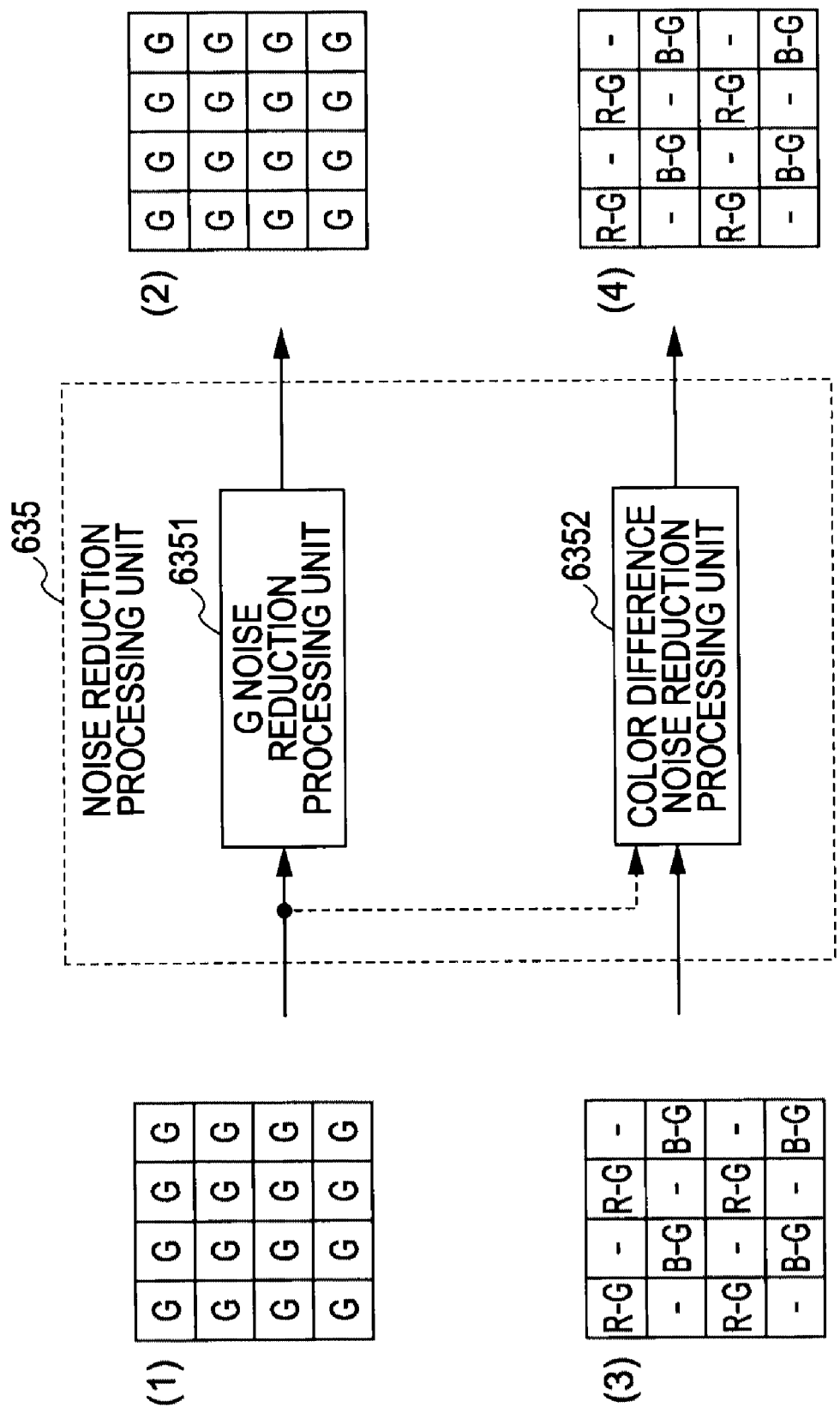

FIG. 8A
| No. 1 | No. 2 | No. 3 |
|-------|-------|-------|
| No. 4 | T | No. 5 |
| No. 6 | No. 7 | No. 8 |
FIG. 8B
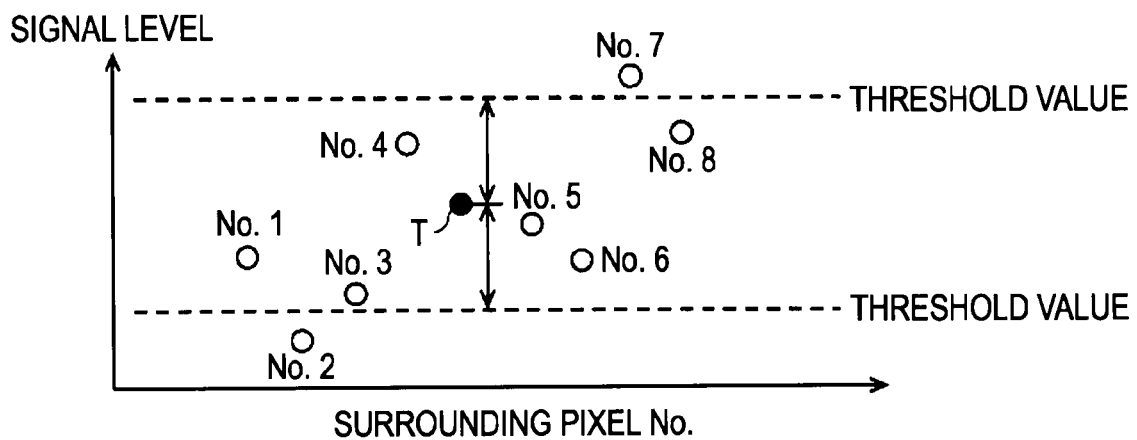
FIG. 8C
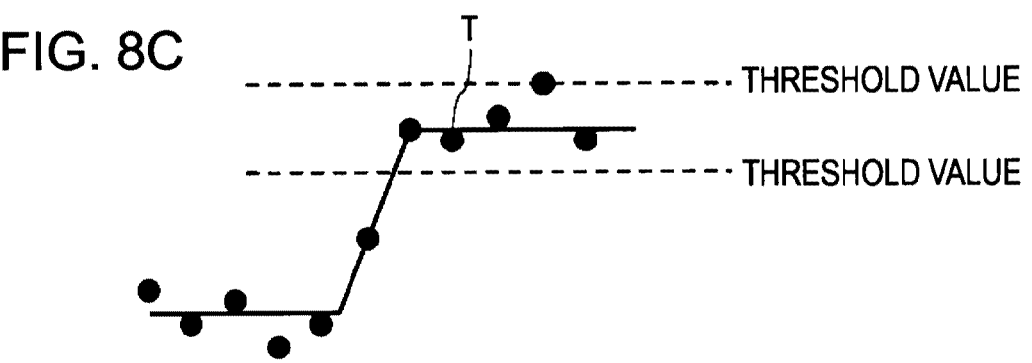

STANDARD DEFINITION (SD) IMAGE SIGNAL

$$Y = 0.299R + 0.587G + 0.114B \quad \cdots (1)$$

$$Cr = 0.5\{(R-G) - 0.3374(B-G)\} \quad \cdots (2)$$

$$Cb = 0.5\{(B-G) - 0.1626(R-G)\} \quad \cdots (3)$$

HIGH DEFINITION (HD) IMAGE SIGNAL

$$Y = 0.2126R + 0.7152G + 0.0772B \quad \cdots (4)$$

$$Cr = 0.5\{(R-G) - 0.0917(B-G)\} \quad \cdots (5)$$

$$Cb = 0.5\{(B-G) - 0.2291(R-G)\} \quad \cdots (6)$$

FIG. 18A

| B | G | B | G | B | G | B |
|---|---|---|---|---|---|---|
| G | R | G | R | G | R | G |
| B | G | B | G | B | G | B |
| G | R | G | R | G | R | G |
| B | G | B | G | B | G | B |
| G | R | G | R | G | R | G |
| B | G | B | G | B | G | B |

FIG. 18B

IMAGE PICKUP APPARATUS, COLOR NOISE REDUCTION METHOD, AND COLOR NOISE REDUCTION PROGRAM

CROSS REFERENCES TO RELATED APPLICATIONS

The present invention contains subject matter related to Japanese Patent Application JP 2007-330509 filed in the Japanese Patent Office on Dec. 21, 2007, the entire contents of which are incorporated herein by reference.

BACKGROUND OF THE INVENTION

1. Field of the Invention

The present invention relates to a method and a program for reducing color noise in an image signal captured by a so-called single-panel image pickup apparatus including one solid-state image sensing device, such as a charged coupled device (CCD) or one complementary metal oxide semiconductor (CMOS) device.

2. Description of the Related Art

So-called single-panel image pickup apparatuses, such as single-panel digital still cameras and single-panel digital video cameras, include one solid-state image sensing device, such as a CCD or a CMOS device. The CCD or CMOS device includes a color filter having pixels of a plurality of colors arranged in a predetermined order. In general, the image pickup apparatuses perform a plurality of processes on an image signal input from the solid-state image sensing device so as to generate an image.

For example, when the color coding of a color filter of the solid-state image sensing device is defined as a Bayer arrangement, each of the pixels has information of only one color: R (red), G (green), or B (blue). That is, the Bayer arrangement includes lines each including alternately appearing R's and G's in the horizontal direction (i.e., RGRG . . . ) and lines each including alternately appearing G's and B's in the horizontal direction (i.e., GBGB . . . ). These two types of line are alternately arranged in the vertical direction, and the numbers of G pixels, B pixels, and R pixels are in a ratio of 2:1:1.

Three signals for the primary colors R, G, and B are necessary for each of the pixels of an image. Accordingly, missing color information (missing color signals) for each pixel is generated by interpolating pixels surrounding the pixel and generates the color information for the R, G, and B colors for each pixel. Such a process for generating three R, G, and B color information items (three primary color signals) for each pixel using raw image data (original data acquired from the image sensing device) having information for only one color is referred to as a "demosaic process (synchronization process)".

After a demosaic process is performed, an R signal, a G signal, and a B signal for each of the pixels are Y/C-converted into a luminance signal (Y) and a color difference signals (Cb/Cr). Thereafter, an image to be displayed is generated from an image signal including a luminance signal (Y) and a color difference signals (Cb/Cr). Alternatively, an image signal including a luminance signal (Y) and a color difference signals (Cb/Cr) is record on a recording medium.

In recent years, the pixel size of solid-state image sensing devices has been reduced. Accordingly, the S/N ratio (a signal to noise ratio) has been degraded, and therefore, noise in an image has become more of a problem. Noise in a color image includes luminance noise, which is noise on a luminance signal component, and color noise, which is noise on a color difference signal component. By reducing color noise, the quality of an image can be increased.

For example, for digital still cameras, Japanese Unexamined Patent Application Publication No. 2005-311455 describes a technique for efficiently removing noise from a raw image data by selecting a pixel area appropriate for a noise reduction process and performing the noise reduction process using the selected surrounding pixels.

In addition, Japanese Unexamined Patent Application Publication No. 2004-221838 describes a technique for accurately reconstructing an edge in a demosaic process by interpolating the pixel value of a pixel of interest using the pixel values of pixels in a predetermined area extending along a direction in which the edge extends.

However, if color noise is removed from raw image data, a luminance signal component is affected, and therefore, the luminance value of each color signal may be changed. As a result, an edge portion may be displayed with a false color, and the quality of the image may be significantly deteriorated.

Therefore, since a color difference signal for representing a color is generated after Y (luminance)/C (color) conversion is performed, a color noise reduction process is performed after the Y/C conversion is performed, in general. However, although color noise has an impulse shape before a demosaic process is performed, the characteristic of the noise is changed after the demosaic process is performed (i.e., the shape of the noise is changed to a shape other than an impulse shape). This is because the color noise signal passes through complicated filters for an interpolation sub-process and an aperture correction sub-process of the demosaic process. If the characteristic of the noise signal is changed, it is difficult to separate a noise signal component from a picture signal component. Accordingly, it is difficult to completely remove the color noise.

SUMMARY OF THE INVENTION

In order to solve the problem that color noise is not completely removed from a Y/C-converted signal obtained after a demosaic process is performed due to a change in the color noise characteristic, Japanese Patent Application No. 2006-338233 filed by the present inventor describes a method for performing a color noise reduction process before a demosaic process that may change the characteristic of the color noise is performed.

In the method described in this publication, a simplified demosaic process is performed in order to generate a color different signal. In the simplified demosaic process, correlation directions of an image are not determined so that the color noise characteristic of an image signal output from a solid-state image sensing device in a raw state (a raw image signal) is not changed. The generated color difference signal is subjected to a noise reduction process. The color difference signal is then changed to an image signal in a raw state again. Thereafter, a normal demosaic process in which correlation directions of the image are determined is performed.

By using this method, color noise can be removed before a normal demosaic process (an original demosaic process) is performed. Accordingly, this method is significantly effective for improving the quality of an image. However, in this method, a simplified demosaic process and a process for changing a luminance signal and a color difference signal subjected to a color noise reduction process to signals in a raw state are additionally performed, as compared in the case of normal camera signal processing.

That is, this method is particularly useful for high-performance image pickup apparatuses having sufficient resources, such as the features, performance, and capacity of hardware. However, a demand for appropriately and rapidly reducing color noise even in image pickup apparatuses having fewer resources is increasing.

In addition, in this method, a color difference signal generated through the simplified mosaic process added before noise reduction is performed is different from a color difference signal generated after a normal demosaic process provided after noise reduction is performed. Therefore, theoretically, even when noise reduction is performed on a color difference signal generated after the simplified demosaic process is performed, color noise may not be sufficiently reduced in a color difference signal after a normal demosaic process is performed, which is a color difference signal of a final image. Accordingly, a demand for more precise color noise reduction processing is growing.

Accordingly, the present invention provides an image pickup apparatus, a method, and a program for rapidly and effectively reducing color noise in an image signal including color signals of a plurality of colors without using a large amount of resources.

According to an embodiment of the present invention, an image pickup apparatus includes an image sensing device including a color filter having pixels of a plurality of different colors arranged in a predetermined order, where the image sensing device receives an image of a subject and outputs an image signal including color signals of the plurality of different colors, and demosaic processing means for generating color signals of the different colors for each of pixels of the image from the image signal received from the image sensing device. The demosaic processing means includes a generation unit and a noise reduction unit. The generation unit performs computation using a target color signal representing a predetermined target color signal included in the image signal received from the image sensing device and a predetermined different color signal so as to generate a color-related signal that associates the target color signal with the predetermined different color signal for a pixel of the target color signal, and the noise reduction unit performs a noise reduction process on the color-related signal generated by the generation unit.

According to the image pickup apparatus of the embodiment, demosaic processing is performed on an image signal (a raw image signal) including a plurality of color signals input from an image sensing device using the demosaic processing means. Therefore, the plurality of color signals are generated for each of the pixels of the image.

In the demosaic processing means, the generation unit performs computation using a target color signal (e.g., an R (red) signal or a B (blue) signal) representing an image signal to be processed and a predetermined different color signal (e.g., a G (green) signal) so as to generate a color-related signal (e.g., a color difference signal or a color ratio signal). Subsequently, the noise reduction unit performs a noise reduction process on the color-related signal generated by the generation unit. In this way, the demosaic processing is performed using a color-related signal having a reduced color noise.

Thus, noise reduction processing can be performed on a color-related signal generated through the demosaic processing. Accordingly, additional hardware is not necessary except for the noise reduction unit, and therefore, color noise can be reduced at high speed. In addition, since color noise can be reduced through the demosaic processing, color noise can be reduced most effectively.

As described above, according to the embodiment, a color noise component can be rapidly and most effectively reduced from an image signal including a plurality of color signals. That is, color noise can be effectively reduced.

BRIEF DESCRIPTION OF THE DRAWINGS

FIGS. 4A to 4E are diagrams illustrating the case where not only the G signal but also the R signal and B signal are directly generated by interpolation from raw moving image data having a Bayer arrangement;

FIGS. 5A to 5G are diagrams illustrating the case where an R signal and a B signal are generated from raw moving image data having a Bayer arrangement using color difference signals;

FIG. 7 is a block diagram of an exemplary configuration of the noise reduction processing unit shown in FIG. 6;

FIGS. 8A to 8C illustrate a function of an ε filter;

FIGS. 9A and 9B illustrate the processing performed by an ε filter in the noise reduction processing unit shown in FIG. 7;

FIGS. 15A to 15C illustrate the processing performed by an ε filter in the noise reduction processing unit shown in FIG. 14;

FIG. 17 shows the computational expressions for a Y/C conversion process performed in accordance with the type of an image signal;

FIGS. 18A and 18B illustrate the color coding of a color filter;

DESCRIPTION OF THE PREFERRED EMBODIMENTS

Various exemplary embodiments of an apparatus, a method, and a program of the present invention are described below with reference to the accompanying drawings. The exemplary embodiments are applicable to a variety of types of image processing apparatuses, such as a camera module incorporated in mobile electronic devices (e.g., digital video cameras, digital still cameras, and cell phones), image readers, and scanners.

However, for simplicity, description is made with reference to an example in which the following exemplary embodiments are applied to a digital video camera (an image pickup apparatus) that can capture a moving image and record the data of the image. In addition, an image pickup apparatus described below can record sound together with moving image data. However, in the following embodiments, for simplicity, description of a processing system of a sound signal is not provided.

First Exemplary Embodiment

Exemplary Configuration of Image Pickup Apparatus

Figure 1:
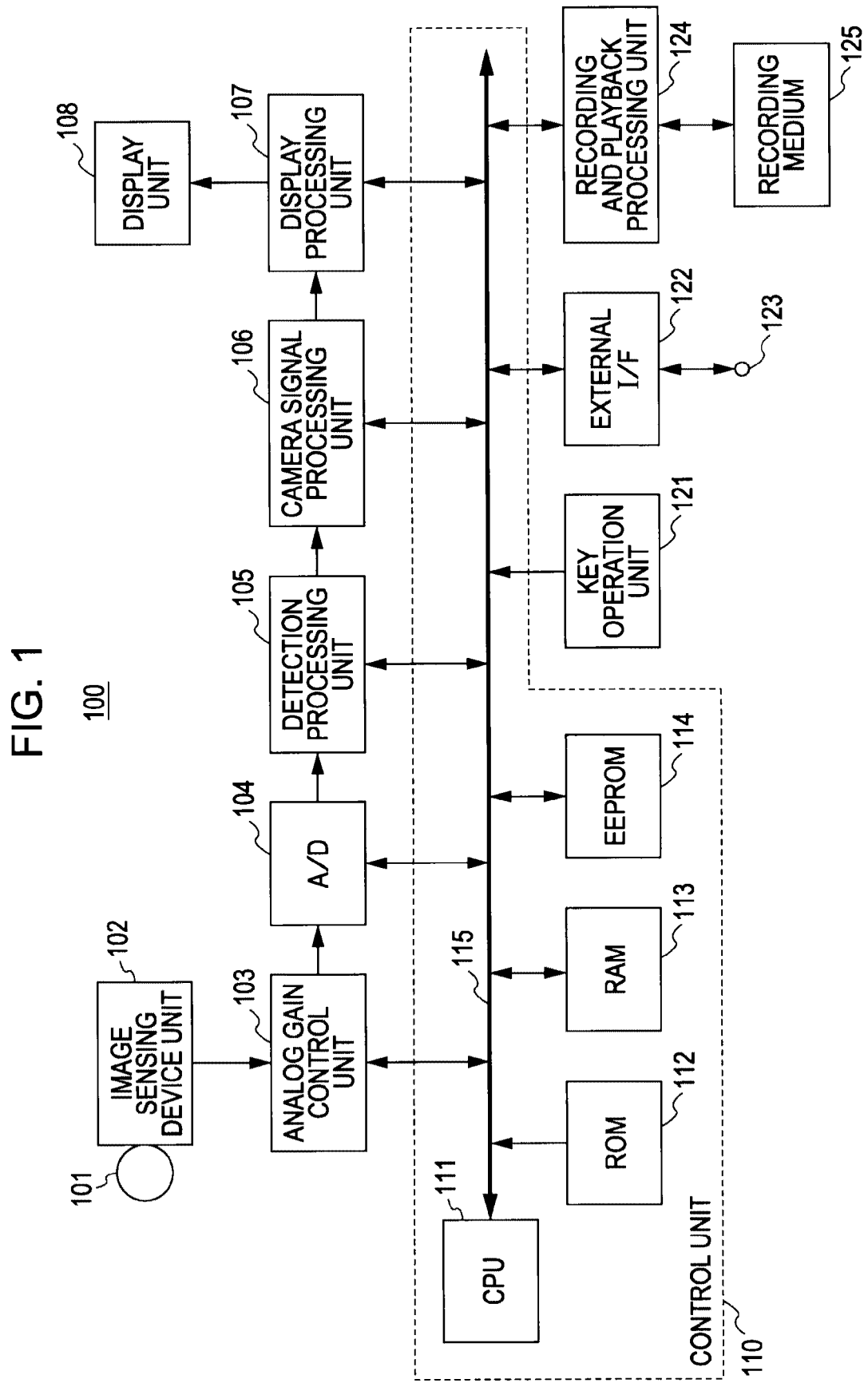
FIG. 1 is a block diagram of an image pickup apparatus according to a first embodiment of the present invention.

FIG. 1 is a block diagram of an image pickup apparatus 100 according to a first exemplary embodiment of the present invention. As shown in FIG. 1, the image pickup apparatus 100 includes a processing system of an image signal. The processing system includes a lens unit 101, an image sensing device unit 102, an analog gain control unit 103, an analog-to-digital (A/D) converter 104, a detection processing unit 105, a camera signal processing unit 106, a display processing unit 107, and a display unit 108. The image pickup apparatus 100 further includes a control unit 110, a key operation unit 121, an external interface (hereinafter referred to an "external I/F") 122, an external input/output terminal 123, a recording and playback processing unit 124, and a recording medium 125.

The control unit 110 controls all units of the image pickup apparatus 100 according to the present embodiment. The control unit 110 is formed from a microcomputer including a central processing unit (CPU) 111, a read only memory (ROM) 112, a random access memory (RAM) 113, and an electrically erasable and programmable ROM (EEPROM) 114 connected to one another via a CPU bus 115.

The CPU 111 reads a program stored in the ROM 112 described below and executes the readout program so as to generate control signals, which are delivered to the various units. In addition, the CPU 111 receives signals sent from the units and processes the received signals. In this way, the CPU 111 performs control. As described above, the ROM 112 prestores the programs to be executed by the CPU 111 and various data used for the programs.

The RAM 113 is used for a work area that temporarily stores intermediate results of various processing, for example. The EEPROM 114 is a nonvolatile memory. For example, the EEPROM 114 stores various pieces of information maintained even after the image pickup apparatus 100 according to the present embodiment is powered off. Examples of the various pieces of information include a variety of setting parameters and programs additionally provided for new functions.

The key operation unit 121 includes, but not limited to, a recording standby key, a recording start key, a recording stop key, a control key used for telescope function, a variety of control keys, and a variety of function keys. The key operation unit 121 receives user inputs and converts the inputs to electrical signals, which are supplied to the control unit 110. Thus, the control unit 110 controls the various units of the image pickup apparatus 100 in accordance with user inputs supplied through the key operation unit 121. In this way, an operation that a user intends to make can be appropriately performed.

The external I/F 122 and the external input/output terminal 123 comply with the IEEE (Institute of Electrical and Electronics Engineers, Inc.) 1394 standard or the USB (Universal Serial Bus) standard. An external apparatus (e.g., a personal computer or a personal video recorder (PVR)) having an interface that complies with the same standard can be connected to the external I/F 122 and the external input/output terminal 123.

The recording and playback processing unit 124 records image data supplied to the control unit 110 on the recording medium 125 under the control of the control unit 110. In addition, the recording and playback processing unit 124 reads image data recorded on the recording medium 125 and supplies to the display processing unit 107. In this way, the image data is played back.

The recording medium 125 serves as a main recording medium of the image pickup apparatus 100 according to the present embodiment. For example, the recording medium 125 may be an internal semiconductor memory, a removable memory card including a semiconductor memory, a compact internal hard disk, a removable disk recording medium (e.g., an optical disk), or a removable magnetic tape. In the image pickup apparatus 100 according to the present embodiment, a compact internal hard disk, for example, is used for the recording medium 125.

Image data is compressed using a predetermined data compression method and stored in the recording medium 125. Image data read from the recording medium 125 is decompressed in accordance with the predetermined data compression method. The data compression and decompression are performed using a compression/decompression processing unit (not shown). Alternatively, the recording and playback processing unit 124 may have such a compression/decompression function of an image data.

In addition, according to the present embodiment, the image pickup apparatus 100 has a recording function and a playback function. In the recording function, a subject image input through the processing system of an image signal is displayed on a display screen of a display device of the display unit 108 and is captured. The captured image is converted to an image signal (a moving image signal) and is recorded on the recording medium 125. In the playback function, an image signal recorded on the recording medium is read out. The readout image signal is displayed on a display screen of the display device of the display unit 108 or supplied to an external apparatus via the external I/F and the external input/output terminal 123.

Recording Function (Image Capturing Function) and Playback Function

The recording function of the image pickup apparatus according to the present embodiment is first described. As shown in FIG. 1, the processing system of an image signal includes the lens unit 101, the image sensing device unit 102, the analog gain control unit 103, the A/D 104, the detection processing unit 105, the camera signal processing unit 106, the display processing unit 107, and the display unit 108, which are connected to one another via the common CPU bus 115.

Data are basically exchanged among the units of the image signal processing system via the common CPU bus 115. However, in some cases, data are directly exchanged between the units without using the CPU bus 115. When the units are directly connected to each other without using the CPU bus 115 and data are transferred between the units, the units can be considered to be one processing unit.

Upon receiving, via the key operation unit 121, an instruction to capture a moving image, the control unit 110 controls the units so as to start a capturing operation of a moving image. In such a case, a subject image is formed on an image forming plane of a solid-state image sensing device of the image sensing device unit 102 through the lens unit 101. The subject image is sequentially converted into an electrical signal (an analog moving image signal) by means of the solid-state image sensing device and is supplied to the analog gain control unit 103. Examples of the solid-state image sensing device provided to the image sensing device unit 102 include a CCD sensor or a CMOS sensor.

An analog moving image signal supplied to the analog gain control unit 103 is gain-controlled so that the gain of the analog moving image signal is at a predetermined level. The gain-controlled analog moving image signal is supplied to the A/D converter 104. The analog moving image signal supplied to the A/D converter 104 is converted into a digital moving image signal (digital raw moving image data) and is supplied to the detection processing unit 105. As used herein, the term "digital raw moving image data" refers to digital moving image data that is not subjected to a development process. The digital raw moving image data is an image signal converted from the analog moving image signal output from the image sensing device unit 102 into a digital format.

The detection processing unit 105 generates collection of development parameters (development parameter group) Pm the detection processing unit 105 generates a collection of development parameters (a development parameter group) Pm on the basis of the received raw moving image data. The development parameter group Pm includes parameters for various downstream image processing, such as a parameter for an exposure control process and a parameter for a while balance control process. The detection processing unit 105 then supplies the generated development parameter group Pm to the camera signal processing unit 106 via the control unit 110. The detection processing unit 105 further supplies the raw moving image data to the camera signal processing unit 106.

As described in more detail below, the camera signal processing unit 106 performs a black level matching process, a white balance control process, a demosaic process (a synchronization process) for generating RGB data (three primary color data items), an aperture correction process, a gamma (γ) correction process, a conversion process to obtain a luminance signal (Y) and a color difference signal (C) (a Y/C conversion process), and a resolution conversion process. Thus, the luminance signal and the color difference signal (hereinafter simply referred to as a "YC signal") are generated.

The YC signal generated by the camera signal processing unit 106 is supplied to the display processing unit 107. The display processing unit 107 converts the YC signal into a moving image signal in a format suppliable to the display unit 108. Thus, the captured moving image of the subject can be displayed on a display screen of the display device of the display unit 108.

At the same time, the YC signal generated by the camera signal processing unit 106 is compressed by, for example, a compression/decompression processing unit (not shown). Thereafter, the YC signal is supplied to the recording and playback processing unit 124. The recording and playback processing unit 124 records supplied image data on the recording medium 125 mounted therein so that the image data can be read out.

For example, the display unit 108 includes a display device, such as a liquid crystal display (LCD), an organic electroluminescence panel, or a cathode ray tube (CRT). As described above, the display unit 108 receives a moving image signal from the display processing unit and displays a moving image on a display screen of the display device thereof in accordance with the received moving image signal.

As described above, according to the present embodiment, the image pickup apparatus 100 can capture a moving image of a subject that is displayed on a display screen of the display device of the display unit 108 and record moving image data based on the captured moving image on the recording medium 125. As mentioned earlier, when moving image data based on the captured moving image is recorded on the recording medium 125, the moving image data is compressed by, for example, the compression/decompression processing unit (not shown). Thereafter, the moving image data is recorded on the recording medium 125 via the recording and playback processing unit 124.

The playback function of the image pickup apparatus 100 according to the present embodiment is described next. Upon receiving, via the key operation unit 121, an instruction to play back a moving image data recorded on the recording medium 125, the control unit 110 controls the recording and playback processing unit 124 so that the recording and playback processing unit 124 reads out the specified moving image data. The recording and playback processing unit 124 then supplies to, for example, a compression/decompression processing unit (not shown). The compression/decompression processing unit decompresses the moving image data into the original uncompressed moving image data. Subsequently, the recording and playback processing unit 124 supplies the moving image data to the display processing unit 107 via the control unit 110.

The display processing unit 107 converts the decompressed moving image data into a format suppliable to the display unit 108. Subsequently, the moving image data is supplied to the display unit 108. Thus, a moving image can be displayed on a display screen of the display device of the display unit 108 in accordance with the moving image data read from the recording medium 125.

At the same time, the compressed moving image data is decompressed by a compression/decompression processing unit (not shown) into an original moving image data before data compression process is performed. The decompressed moving image data is supplied to an external device connected to the image pickup apparatus 100 via the external I/F 122 and the external input/output terminal 123. In this way, the moving image data can be used by the external apparatus.

As described above, according to the present embodiment, the image pickup apparatus 100 can record the captured moving image data on the recording medium 125 or play back the moving image data. In this way, the image pickup apparatus 100 can use moving image data recorded on the recording medium 125. In addition, according to the present embodiment, the image pickup apparatus 100 can reduce color noise most effectively using existing camera signal processing without increasing use of high-load processing, such as a demosaic processing dedicated to noise reduction.

Camera Signal Processing Unit 106

Figure 2:
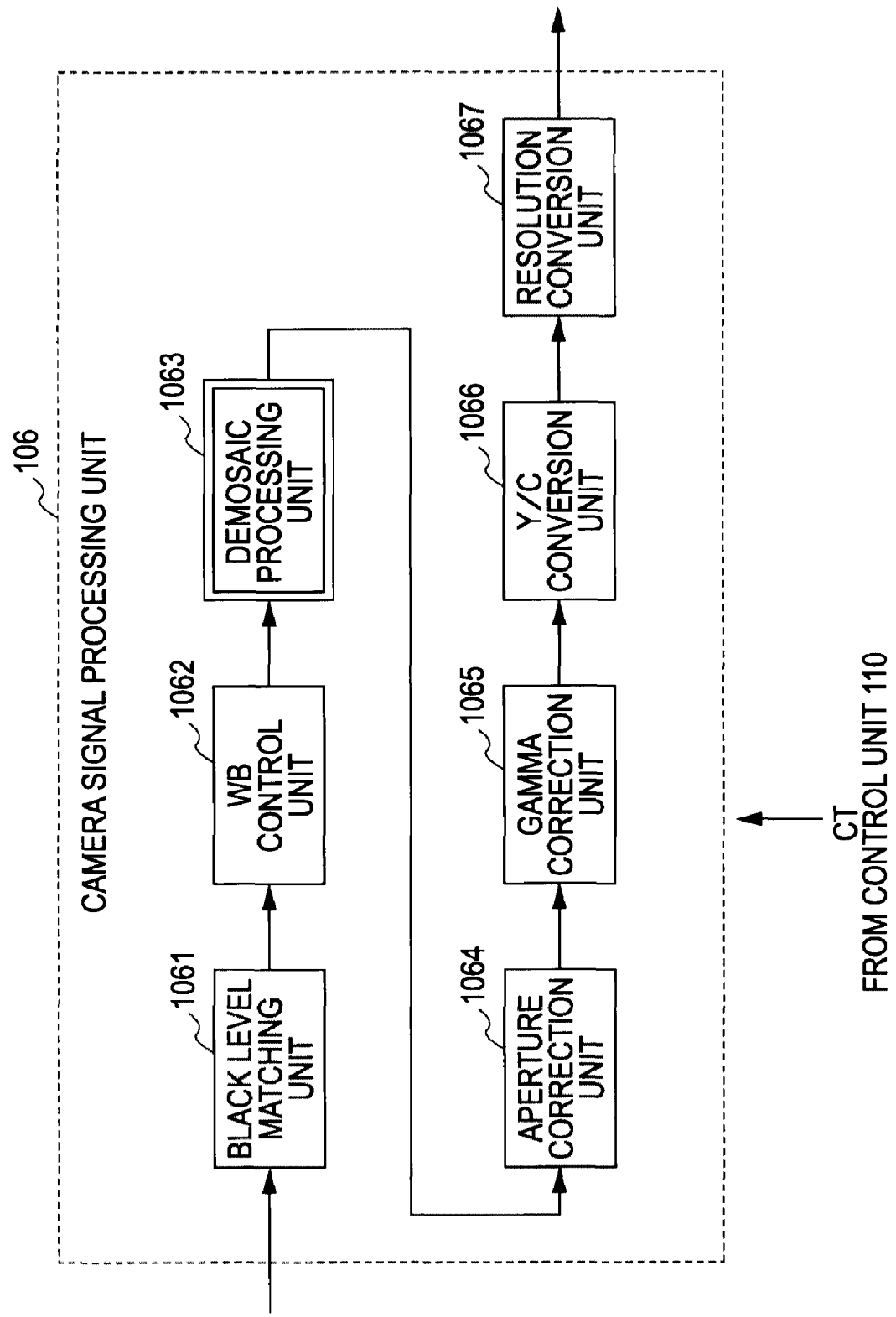
FIG. 2 is a block diagram illustrating an exemplary configuration of the camera signal processing unit installed in the image pickup apparatus shown in FIG. 1.

An exemplary configuration of the camera signal processing unit 106 of the image pickup apparatus 100 according to the present embodiment shown in FIG. 1 is described next. FIG. 2 is a block diagram illustrating the exemplary configuration of the camera signal processing unit 106 installed in the image pickup apparatus 100 according to the present embodiment.

As shown in FIG. 2, according to the present embodiment, the camera signal processing unit 106 includes a black level matching unit 1061, a white balance (WB) control unit 1062, a demosaic processing unit 1063, an aperture correction unit 1064, a gamma correction unit 1065, a Y/C conversion unit 1066, and a resolution conversion unit 1067.

As described above, the raw moving image data output from the detection processing unit 105 is supplied to the black level matching unit 1061 of the camera signal processing unit 106. The black level of an image pickup apparatus represents an image output from an image sensing device when the imaging plane of the image sensing device is completely blocked from light. However, for example, if an offset component enters the image sensing device from the downstream circuit, a correct black level is not obtained. In such a case, the image may not be appropriately formed. In order to prevent such a case, the black level matching unit 1061 controls the black level of the received raw moving image data using the output level of the detection processing unit 105. After the black level is adjusted, the raw image data is supplied to the WB control unit 1062.

The human eye tends to recognize an object to be white as a white object regardless of the type of light (e.g., the sunlight or fluorescent light) emitted to a subject. However, when an image of a subject is captured using an image pickup apparatus, the tint of the subject is different in accordance with the type of light emitted to the subject at the image capturing time. Therefore, the WB control unit 1062 controls the color balance (more specifically, a balance between R (red) and B (blue)) of the entire image on the basis of parameters output from the detection processing unit 105 so that an object to be white is represented as a white object. The raw moving image data having a controlled white balance is supplied to the demosaic processing unit 1063.

The raw moving image data is generated by using different color signals from different pixels of the image sensing device in accordance with a color filter of the image sensing device. The demosaic processing unit 1063 generates color signals of all colors for each of the pixels that form the image. In the present embodiment, the demosaic processing unit 1063 generates three primary color signals R, G, and B for each of the pixels.

According to the present embodiment, the demosaic processing unit 1063 performs a color noise reduction process during the demosaic processing. As described above, the demosaic processing unit 1063 can reduce color noise most effectively using existing camera signal processing without increasing use of high-load processing, such as a demosaic processing dedicated to noise reduction. The three primary color signals R, G, and B (three primary color data items) generated by the demosaic processing unit 1063 are supplied to the aperture correction unit 1064. The noise reduction process is described in more detail below.

The aperture correction unit 1064 performs an edge enhancement process on the received three primary color data items so as to sharpen the image. Thus, the image becomes a clear image. In the image pickup apparatus 100 according to the present embodiment, the level of edge enhancement can be controlled in accordance with a control signal received from the control unit 110. The control signal is generated in accordance with a user instruction input through, for example, the key operation unit 121. The image can be changed to a sharp image or a soft image. The three primary color data items output from the aperture correction unit 1064 are supplied to the gamma correction unit 1065.

The gamma correction unit 1065 controls the relative relationship between the received three primary color data items and the three primary color data items actuary output. That is, a gamma ($\gamma$) value represents a ratio of a variation in a voltage equivalence value to a variation in the luminance of the image. Ideally, the gamma value is close to "1". However, due to the characteristics of a device in use, the value may be changed from "1". Accordingly, the gamma correction unit 1065 corrects an error of the gamma value of the received moving image data so that the gamma value is close to "1". The moving image data (the three primary color data items) processed by the gamma correction unit 1065 are supplied to the Y/C conversion unit 1066.

The Y/C conversion unit 1066 converts the received moving image data (the three primary color data items) to a luminance signal (Y) and color difference signals (Cb and Cr) using a predetermined computation expression. Thereafter, the Y/C conversion unit 1066 supplies a YC signal including the luminance signal (Y) and the color difference signals (Cb and Cr) to the resolution conversion unit 1067.

The resolution conversion unit 1067 performs a scaling operation on the image represented by the received YC data. That is, the resolution conversion unit 1067 performs a thinning-out process or an interpolation process on the received YC data so as to generate YC data having a predetermined resolution. The resolution conversion unit 1067 then outputs the YC data. An image corresponding to the YC data output from the resolution conversion unit 1067 is displayed on the display unit 108 via the display processing unit 107 shown in FIG. 1. In addition, after the YC data is compressed, the YC data is recorded on the recording medium 125 via the recording and playback processing unit 124.

As described above, in the camera signal processing unit 106, the above-described various processing is performed on the raw moving image data of the subject captured by the image sensing device unit 102. Eventually, YC data having a resolution appropriate for a display operation or a recording operation is generated and output. In addition, according to the present embodiment, the demosaic processing unit 1063 of the camera signal processing unit 106 performs a color noise reduction process, which is described in more detail below.

First Exemplary Configuration and Overview of Processing of Demosaic Processing Unit 1063 (Bayer Arrangement)

Figure 3:
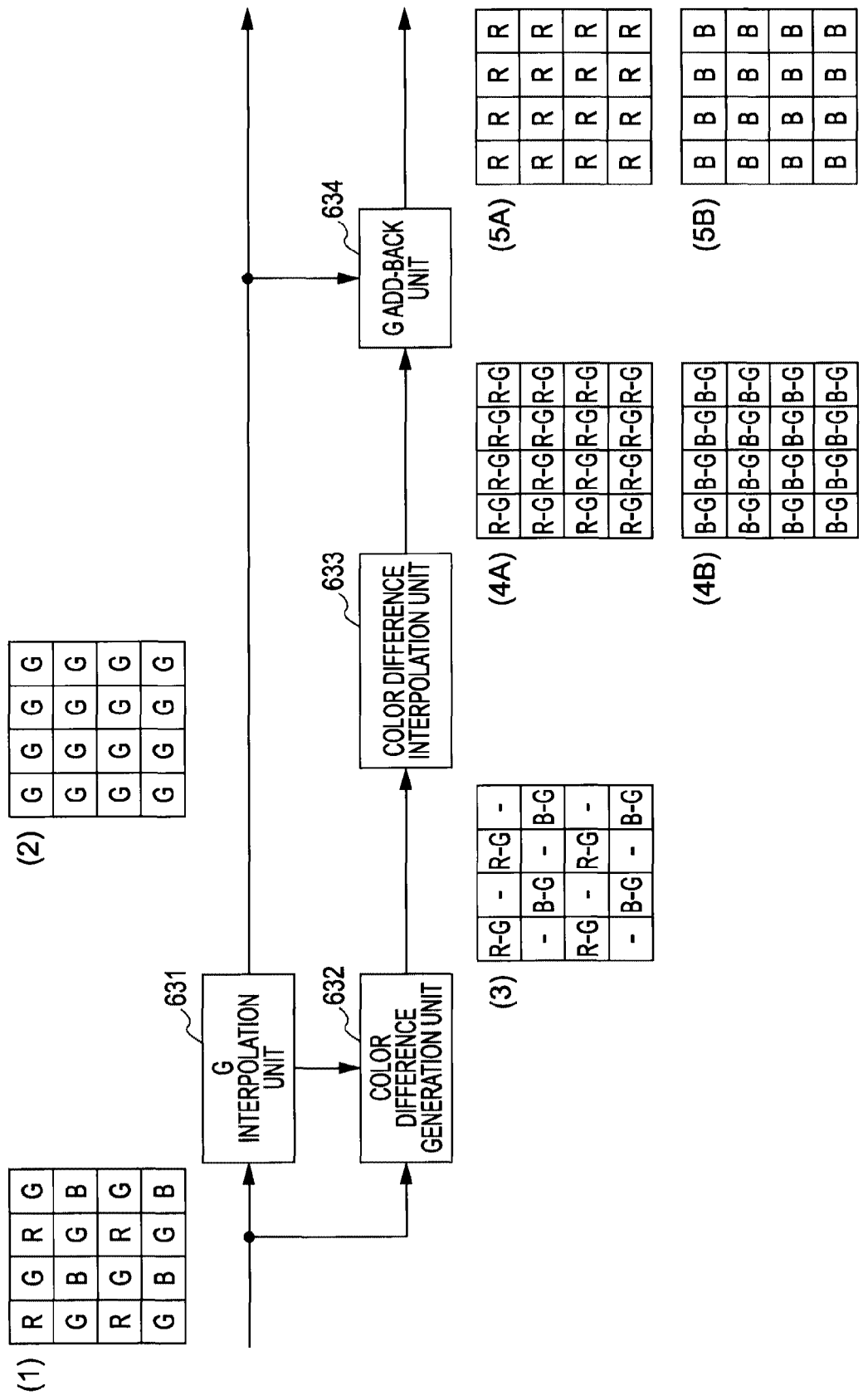
FIG. 3 is a block diagram illustrating a first exemplary configuration and the overview of processing of a demosaic processing unit according to the first embodiment of the present invention.

FIG. 3 is a block diagram illustrating a first exemplary configuration and the overview of processing of the demosaic processing unit 1063 of the camera signal processing unit 106 according to the present embodiment shown in FIG. 2. As shown in FIG. 3, the demosaic processing unit 1063 includes a G (green) signal interpolation unit 631 (indicated as a "G interpolation unit" in FIG. 3), a color difference generation unit 632, a color difference interpolation unit 633, and a G (green) signal add-back unit 634 (indicated as a "G add-back unit" in FIG. 3).

In this embodiment, description is made with reference to a solid-state image sensing device including a color filter having color coding of the Bayer arrangement. Accordingly, raw moving image data formed in accordance with the Bayer arrangement is supplied to the demosaic processing unit 1063. As indicated by pattern (1) shown in FIG. 3, the Bayer arrangement includes lines each including alternately appearing R's and G's for pixels arranged in the horizontal direction (i.e., RGRG . . . ) and lines each including alternately appearing G's and B's for pixels arranged in the horizontal direction (i.e., GBGB . . . ). These two types of line are alternately arranged in the vertical direction. More specifically, raw moving image data having pattern (1) shown in FIG. 3 is input to the demosaic processing unit 1063 on a screen-by-screen basis (a frame-by-frame basis). Each pixel of a screen has a color signal (color data) of one of three colors R (red), G (green), and B (blue). The raw moving image data is then supplied to the G interpolation unit 631 and the color difference generation unit 632.

As indicated by pattern (1) shown in FIG. 3, in the Bayer arrangement, G signals are present in a checkered pattern. The G interpolation unit 631 generates a G signal for each of the pixels having no G signal by interpolating the G signals of pixels around the pixel and correlating the G signals. In this way, as indicated pattern (2) shown in FIG. 3, G signals are generated and output from the G interpolation unit 631 for all of the pixels of the image.

In terms of an R signal and a B signal, the color difference generation unit 632 generates a color difference signal an (R–G) signal for the pixel of an R signal and generates a color difference signal a (B–G) signal for the pixel of a B signal. In this way, as indicated pattern (3) shown in FIG. 3, the generated (R–G) signals are output from the color difference generation unit 632 for the pixels of an R signal, and the generated (B–G) signals are output from the color difference generation unit 632 for the pixels of a B signal.

The (R–G) signals and (B–G) signals output from the color difference generation unit 632 are supplied to the color difference interpolation unit 633. The color difference generation unit 632 interpolates color difference signals (R–G) and (B G) of the pixels having no color difference signals (R–G) and (B–G), respectively, as indicated by patterns (4A) and (4B) shown in FIG. 3.

In this way, as indicated by patterns (4A) and (4B) shown in FIG. 3, the (R–G) signal and the (B–G) signal are output from the color difference interpolation unit 633 for all of the pixels of the image. Subsequently, the (R–G) signal and the (B–G) signal output from the color difference interpolation unit 633 are supplied to the G add-back unit 634.

The G add-back unit 634 adds the G signals output from the G interpolation unit 631 to the color difference signals (the (R–G) signals and (B–G) signals) of all of the pixels output from the color difference interpolation unit 633. Thus, an R signal and a B signal are generated for each of all the pixels. Accordingly, as indicated by patterns (5A) and (5B) shown in FIG. 3, the R signal and the B signal are output from the G add-back unit 634 for each of all the pixels.

Thus, the G signals output from the G interpolation unit 631 for all of the pixels and the R and B signals output from the G add-back unit 634 for all of the signals are output from the demosaic processing unit 1063. That is, three primary color signals R, G, and B are output from each of all the pixels of the image. Such demosaic processing is performed on a frame-by-frame basis so that raw moving image data is converted into RGB moving image data.

Any method that can generate a desired signal can be employed for the interpolation process performed by the G interpolation unit 631, the color difference generation process performed by the color difference generation unit 632, and the interpolation process performed by the color difference interpolation unit 633. That is, in order to generate a desired signal, the surrounding pixels in a variety of ranges and a variety of types of calculation logic can be used.

In addition, as described above, according to the present embodiment, the demosaic processing unit 1063 does not directly generate the R signals and the B signals. The demosaic processing unit 1063 generates the R signals and the B signals using the color difference signals. This is because, by taking into account the G signals, the color of the image can be more accurately reproduced. That is, a false color is not reproduced. The advantage of use of the color difference signal is described with reference to FIGS. 4 and 5.

First, description is made with reference to the case where a G signal, an R signal, and a B signal are generated from raw data having a Bayer arrangement for the pixels having no G signal, no R signal, and no B signal, respectively, through a direct interpolation using color signals of the surrounding pixels.

FIGS. 4A to 4E are diagrams illustrating the case where not only the G signals but also the R signals and B signals are directly generated by interpolation from raw moving image data for a frame. The raw moving image data is input from a solid-state image sensing device having a color filter of the Bayer arrangement. In this example, raw moving image data that forms an achromatic color image (having a black and white vertical stripe pattern) is processed.

The following description is made with reference to raw data having a Bayer arrangement and an achromatic color (a black and white vertical stripe pattern), as shown in FIG. 4A. As shown in FIG. 4B, an image formed by the raw data includes white vertical lines (columns) and black vertical lines (columns) alternately arranged. That is, suppose that the value of each of the R color signal, the G color signal, and the B color signal ranges from 0 to 100. Then, a vertical line formed from R color signals having a value of 100, G color signals having a value of 100, and B color signals having a value of 100 is a white line. In contrast, a vertical line formed from R color signals having a value of 0, G color signals having a value of 0, and B color signals having a value of 0 is a black line.

The R, G, and B signals are generated for each of all the pixels of the image from such raw image data through demosaic processing. As can be seen from FIG. 4A, since the G signals are present at all times in each of the vertical lines (columns), a G signal having a value of 100 in a white line portion and a value of 0 in a black line portion can be properly generated using the G signals present in each of the vertical lines, as shown in FIG. 4C.

In this example, R signals and B signals are also directly generated by interpolation without using a color difference signal. As can be seen from FIG. 4A, an R signal and a B signal are present only in every other vertical line.

Accordingly, in the case of raw data including the color signals as shown in FIG. 4A, if an R signal is generated for a pixel having no R signal by interpolating R signals present in the adjacent pixels, an R signal having a value of 100 is undesirably generated for a pixel in a vertical line having no R signals, as shown in FIG. 4D.

In addition, in the case of raw data including a color signal as shown in FIG. 4A, if a B signal is generated for a pixel having no B signal by interpolating B signals present in the adjacent pixels, a B signal having a value of 0 is undesirably generated, as shown in FIG. 4E. That is, a B signal having a value of 0 is undesirably generated by interpolation for a pixel for which a B signal having a value of 100 should be generated.

In such a case, a correct B signal is not generated for the white line portion. Accordingly, a white color is not represented as an original white color. In addition, since an R signal having a value of 100 is generated for the black line portion, a black color is not accurately represented as an original black color. Therefore, when an R signal or a B signal of a pixel having no R signal or a B signal is directly generated by interpolating the R signals or the B signals of the surrounding pixels, the color of the image may not be represented properly.

Hereinafter, description is made with reference to the case where a G signal for a pixel having no G signal is generated from raw data having a Bayer arrangement directly using the G signals of the surrounding pixels, but an R signal and a B signal for pixels having no R signal and no B signal, respectively, are generated by interpolating color difference signals after generating the color difference signals.

FIGS. 5A to 5G are diagrams illustrating the case where a G signal for a pixel having no G signal is directly generated by interpolating the G signals of the surrounding pixels in a frame of raw moving image data, but an R signal and a B signal for pixels having no R signal and no B signal, respectively, are generated by interpolating color difference signals. The raw moving image data is input from a solid-state image sensing device having a color filter of the Bayer arrangement. Like the case shown in FIGS. 4A to 4E, in the example shown in FIGS. 5A to 5G, raw moving image data that forms an achromatic color image (having a black and white vertical stripe pattern) is processed.

When an R signal and a B signal are generated using color difference signals, a color difference signal (R−G) is used for the R signal and a color difference signal (B−G) is used for the B signal. However, a similar process is performed for generation of each of the two signals. Accordingly, for simplicity, only generation of the R signal using an (R−G) signal is described below.

As in the case described in FIGS. 4A and 4B, as shown in FIG. 5A, raw data having the Bayer arrangement and an achromatic color (a black and white vertical stripe pattern) is processed. As shown in FIG. 5B, an image formed by the raw data includes white vertical lines (columns) and black vertical lines (columns) alternately arranged.

That is, as in the case described in FIG. 4B, suppose that, in the case of FIG. 5B, the value of each of the R color signal, the G color signal, and the B color signal ranges from 0 to 100. Then, a vertical line formed from R color signals having a value of 100, G color signals having a value of 100, and B color signals having a value of 100 is the white line. In contrast, a vertical line formed from R color signals having a value of 0, G color signals having a value of 0, and B color signals having a value of 0 is the black line.

The R, G, and B signals are generated for each of all the pixels of the image from such raw image data through demosaic processing. As can be seen from FIG. 5A, since the G signals are present in each of the vertical lines (columns), a G signal having a value of 100 in a white line portion and a G signal having a value of 0 in a black line portion can be properly generated using the G signals present in each of the vertical lines, as shown in FIG. 5C.

As shown in FIG. 5D, real R signals are recognized on the basis of the R signals present on every other vertical line, as shown in FIG. 5A. In FIG. 5D, a portion (pixels) represented by a symbol "×" is a portion at which an R signal is not present. As shown in FIG. 5E, a color difference signal (R−G) is generated from the R signal recognized as shown in FIG. 5D and the G signal properly generated by interpolation as shown in FIG. 5C.

In FIG. 5E, portions (pixels) indicated by a symbol "×" are portions at which (R−G) signals are not directly generated since R signals are not present. Accordingly, as shown in FIG. 5F, using the (R−G) signals properly generated as shown in FIG. 5E, (R−G) signals are generated by interpolation for the portions (the pixels) represented by the symbol "×" at which (R−G) signals are not directly generated. In such a case, as shown in FIG. 5E, since the (R−G) signals are generated using the real R signals and B signals, the (R−G) signals shown in FIG. 5F and generated by interpolating these R and B signals can be properly generated.

Finally, the G signal generated as shown in FIG. 5C is added back to the (R−G) signal generated as shown in FIG. 5F. Thus, as shown in FIG. 5G, an R signal having a value of 100 for the white line portion and a value of 0 for a black line portion can be properly generated.

As described in FIGS. 4A to 4E, when not only a G signal but also an R signal and a B signal are directly generated by interpolation from the raw data having the Bayer arrangement, an R signal and a B signal can be rapidly generated for each pixel of the image. However, accurate color reproduction of the image is not obtained. In contrast, as described in FIGS. 5A to 5G, when R signals and B signals are generated by interpolation from the raw data having the Bayer arrangement using the color difference signals, highly accurate color reproduction can be obtained, although the processing time slightly increases.

Therefore, according to the present embodiment, as described in FIG. 3, when generating, from the raw moving image data, signals of the three primary color R, G, and B for each of the pixels of the image, the demosaic processing unit 1063 of the image pickup apparatus 100 generates the R signal and B signal using the color difference signals.

In addition, according to the present embodiment, the demosaic processing unit 1063 of the image pickup apparatus 100 removes a color noise component after the raw moving image data having the Bayer arrangement is converted into a G signal and color difference signals (R−G) and (B−G). Accordingly, a color noise component can be effectively reduced during demosaic processing.

Exemplary Configuration of Demosaic Processing Unit 1063

Figure 6:
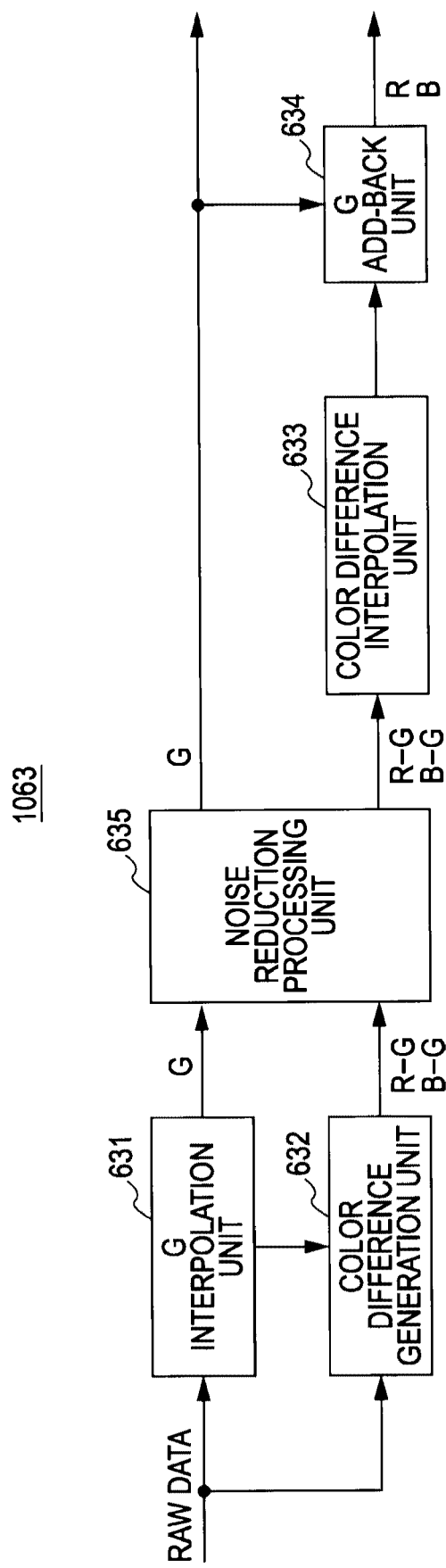
FIG. 6 is a block diagram of a first exemplary configuration of a demosaic processing unit including a noise reduction processing unit according to the first embodiment.

FIG. 6 is a block diagram of a first exemplary configuration of the demosaic processing unit 1063 including a noise reduction processing unit 635 according to the present embodiment. Like the configuration of the demosaic processing unit 1063 shown in FIG. 3, in this example, the demosaic processing unit 1063 includes the G interpolation unit 631, the color difference generation unit 632, the color difference interpolation unit 633, and the G add-back unit 634. As described in FIG. 3, a G signal is directly generated using the G signals of the surrounding pixels. In addition, an R signal and a B signal are generated using the color difference signals. Thus, the signals of the three primary color R, G, and B are generated for each of the pixels of the image.

As shown in FIG. 6, according to the present embodiment, the demosaic processing unit 1063 of the image pickup apparatus 100 includes the noise reduction processing unit 635 immediately downstream of the G interpolation unit 631 and the color difference generation unit 632. Thus, the demosaic processing unit 1063 can reduce a color noise component from image data to be processed (in this example, a G signal generated immediately after interpolation is performed and color difference signals (R−G) and (B−G) generated immediately after the G signal is generated).

In this way, when the noise reduction processing unit 635 is disposed immediately downstream of the G interpolation unit 631 and the color difference generation unit 632, color noise can be effectively reduced. This is because a complicated filter used for interpolation processing in the demosaic process is not applied to the color noise contained in the color difference signal at a time immediately after the color difference signals (R−G) and (B−G) are generated.

Exemplary Configuration of Noise Reduction Processing Unit 635

FIG. 7 is a block diagram of an exemplary configuration of the noise reduction processing unit 635 shown in FIG. 6. As shown in FIG. 7, the noise reduction processing unit 635 includes a G noise reduction processing unit 6351 that reduces noise mixed into a G signal and a color difference noise reduction processing unit 6352 that reduces noise mixed into a color difference signal.

Thus, noise is reduced from a G signal by the G noise reduction processing unit 6351, and noise is reduced from color difference signals (R−G) and (B−G) by the color difference noise reduction processing unit 6352. The G noise reduction processing unit 6351 and the color difference noise reduction processing unit 6352 can employ a variety of noise reduction method. In the present embodiment, an epsilon ($\epsilon$) filter (hereinafter referred to as an "$\epsilon$ filter") is employed.

$\epsilon$ Filter

First, an $\epsilon$ filter is briefly described. FIGS. 8A to 8C are diagrams illustrating an $\epsilon$ filter. An $\epsilon$ filter is one of non-linear filters. An $\epsilon$ filter can reduce noise while maintaining the edge of a picture. The $\epsilon$ filter uses the characteristic of noise signals that most noise signals are high-frequency signals and have a small amplitude.

That is, in general, a noise signal contained in image data is a high-frequency signal having a small amplitude, while a signal of the edge portion of a picture has a large amplitude. Accordingly, for a predetermined area of an image, an $\epsilon$ filter computes a level difference between a pixel of interest and a pixel adjacent to the pixel of interest. The $\epsilon$ filter then compares the level difference with a predetermined threshold value so as to determine whether noise is present or not. By performing computation in accordance with a filter coefficient, the $\epsilon$ filter can smooth the noise.

A particular example is described next with reference to a 3-by-3 pixel area and a pixel of interest T located at the center of the area, as shown in FIG. 8A. In FIG. 8B, the abscissa represents a pixel position (a pixel No.) in the pixel area shown in FIG. 8A. The ordinate represents a signal level (a difference level). A difference in the level (a level difference) between each of the pixels in the pixel area shown in FIG. 8A and the pixel of interest T is plotted in FIG. 8B. Note that, since the pixel of interest T is a reference, the signal level of the pixel of interest T is plotted in place of a difference.

Thereafter, as shown in FIG. 8B, a threshold value width in the vertical direction is represented by two dotted lines that indicate threshold values. The threshold value width is smaller than the amplitude of the picture in the image. For a pixel having a signal level difference from the signal level of the pixel of interest T located outside the area indicated by the threshold value width, it is determined that the difference is due to the picture. Thus, that pixel is not used for smoothing of the pixel of interest T. However, for a pixel having a signal level difference from the signal level of the pixel of interest T located inside the area indicated by the threshold value width, it is determined that the difference is due to noise. Thus, that pixel is used for smoothing of the pixel of interest T.

That is, in the example shown in FIG. 8B, the level difference between a pixel of No. 2 and the pixel of interest T and the level difference between a pixel of No. 7 and the pixel of interest T are located outside the area determined by the threshold value width. Accordingly, the pixel of No. 2 and the pixel of No. 7 are not used in an averaging process for smoothing (i.e., are removed from added pixels).

In contrast, the level difference between each of pixels of No. 1, No. 3, No. 4, No. 5, No. 6, and No. 8 and the pixel of interest T is located inside the area determined by the threshold value width. Accordingly, the pixels of No. 1, No. 3, No. 4, No. 5, No. 6, and No. 8 are used in an averaging process for smoothing (i.e., are included in added pixels).

Accordingly, as shown in FIG. 8B, the pixels of No. 1, No. 3, No. 4, No. 5, No. 6, and No. 8 having level differences from the pixel of interest T that are located within the predetermined threshold value area are included in added pixels of the averaging process for smoothing. Thus, the level of the pixel of interest T is replaced with the level obtained by averaging the levels of the surrounding pixels. This operation is performed for each of the pixels. Thus, all of the pixels are smoothed. In this way, a noise component is removed from each of the pixels and is smoothed. As a result, a smooth image without a noise component can be formed (reproduced) without having an adverse effect on the picture in the image formed by the image signal.

As described in FIG. 8B, in the case of an $\epsilon$ filter, it is determined whether a pixel is to be a target of addition of the averaging process for smoothing on the basis of a predetermined threshold value. Accordingly, an edge having a level greater than the predetermined value can be maintained. That is, for an image with an edge having a level that changes significantly, if, as shown as a solid line in FIG. 8C, a threshold value is determined in accordance with the noise level, a signal located outside the threshold area does not become a target of addition. Therefore, only a noise component of each pixel (indicated by a black circle in FIG. 8C) can be reduced while maintaining the edge in the image.

In the $\epsilon$ filter, the signal level of a pixel used for the averaging process for smoothing the level of the pixel of interest may be weighted. For example, as the distance between a surrounding pixel and the pixel of interest is smaller, the weight for the pixel may be increased.

Overview of Processing Performed by G Noise Reduction Processing Unit 6351

The G noise reduction processing unit 6351 shown in FIG. 7 is described next. The G noise reduction processing unit 6351 sequentially receives a G signal supplied from each of the pixels of an image generated through interpolation performed by the G interpolation unit 631 (see the pattern (1) shown in FIG. 7). Thereafter, in the G noise reduction processing unit 6351, a noise component is removed from the G signal using an $\epsilon$ filter, and the G signal having reduced noise is output (see the pattern (2) shown in FIG. 7).

To reduce noise in the G noise reduction processing unit 6351, another method can be employed. For example, by using a pair of a lowpass filter (LPF) and a subtracting circuit or a pair of a highpass filter and a subtracting circuit, the bandwidth of a G signal can be divided into a high-frequency side (a high-frequency component) and a low-frequency side (a low-frequency component). A coring process and a limit process are performed on the high-frequency side, and an $\epsilon$ filter is applied on the low-frequency side. In this way, different noise reduction processes may be performed on the high-frequency side and on the low-frequency side.

By using this method, even when the level of a picture component is close to the level of a noise component due to low luminance, noise suppression (noise reduction) can be performed without causing creation of an isolated point while maintaining the features of the picture formed by the processed image signal. This method (the method for performing different noise reduction processes on the high-frequency side and on the low-frequency side) is described in detail in Japanese Unexamined Patent Application Publication No. 2007-262875, which was filed by the present inventor.

Note that a G signal has a strong luminance component and has few color noise component. Therefore, in place of performing a noise reduction process in the demosaic processing unit 1063, a noise reduction process of a G signal may be performed before a demosaic process is performed. Alternatively, a noise reduction process may be performed on the Y signal (the luminance signal) subjected to a Y/C conversion performed by the Y/C conversion unit 1066 shown in FIG. 2. That is, the G noise reduction processing unit 6351 shown FIG. 7 is not necessarily provided for the noise reduction processing unit 635. In order to reduce color noise contained in an image signal efficiently, only the presence of the color difference noise reduction processing unit 6352 described in detail below is sufficient.

Overview of Processing Performed by Color Difference Noise Reduction Processing Unit 6352

The color difference noise reduction processing unit 6352 shown in FIG. 7 is described next. A color difference signal (see pattern (3) in FIG. 7) generated by the color difference generation unit 632 is supplied to the color difference noise reduction processing unit 6352. That is, as shown by pattern (3) in FIG. 7, in the color difference generation unit 632, an (R−G) signal is generated for a pixel having an R signal, and a (B−G) signal is generated for a pixel having a B signal. These generated signals are supplied to the color difference noise reduction processing unit 6352 of the noise reduction processing unit 635. Thereafter, in the color difference noise reduction processing unit 6352, the $\epsilon$ filter is applied for the same color so that a noise component (a color noise component) included in the (R−G) signal and the (B−G) signal is removed.

However, if the $\epsilon$ filter is applied only on the basis of the color difference signals (R−G) and (B−G), color bleed may occur in the edge portion of a picture or a color may be missing in the high-frequency portion. That is, for example, when an orange portion and an aqua portion next to the orange portion are contained in a one-frame image (i.e., an edge is formed), color bleed and color missing may occur. This is because, if only the (R−G) signal and the (R−B) signal are used, as shown in pattern (3) in FIG. 7, an inadequate pixel (a pixel in a different color area) may be selected for a target of addition computation of a smoothing process in a portion (an edge portion) where two different colors are adjacent to each other.

Accordingly, in the color difference noise reduction processing unit 6352, when the $\epsilon$ filter is applied, it is determined whether the level difference between a pixel of interest and the surrounding pixel is within a noise threshold value range. In addition, for the color difference signals (R−G) and (B−G), the level difference for a G signal between a pixel of interest and the surrounding pixel from which a color difference signal is obtained. If the level difference for a G signal is within a noise threshold value range, the surrounding pixel becomes the target of the averaging process of the color difference signal.

Figures 9A, 9B:
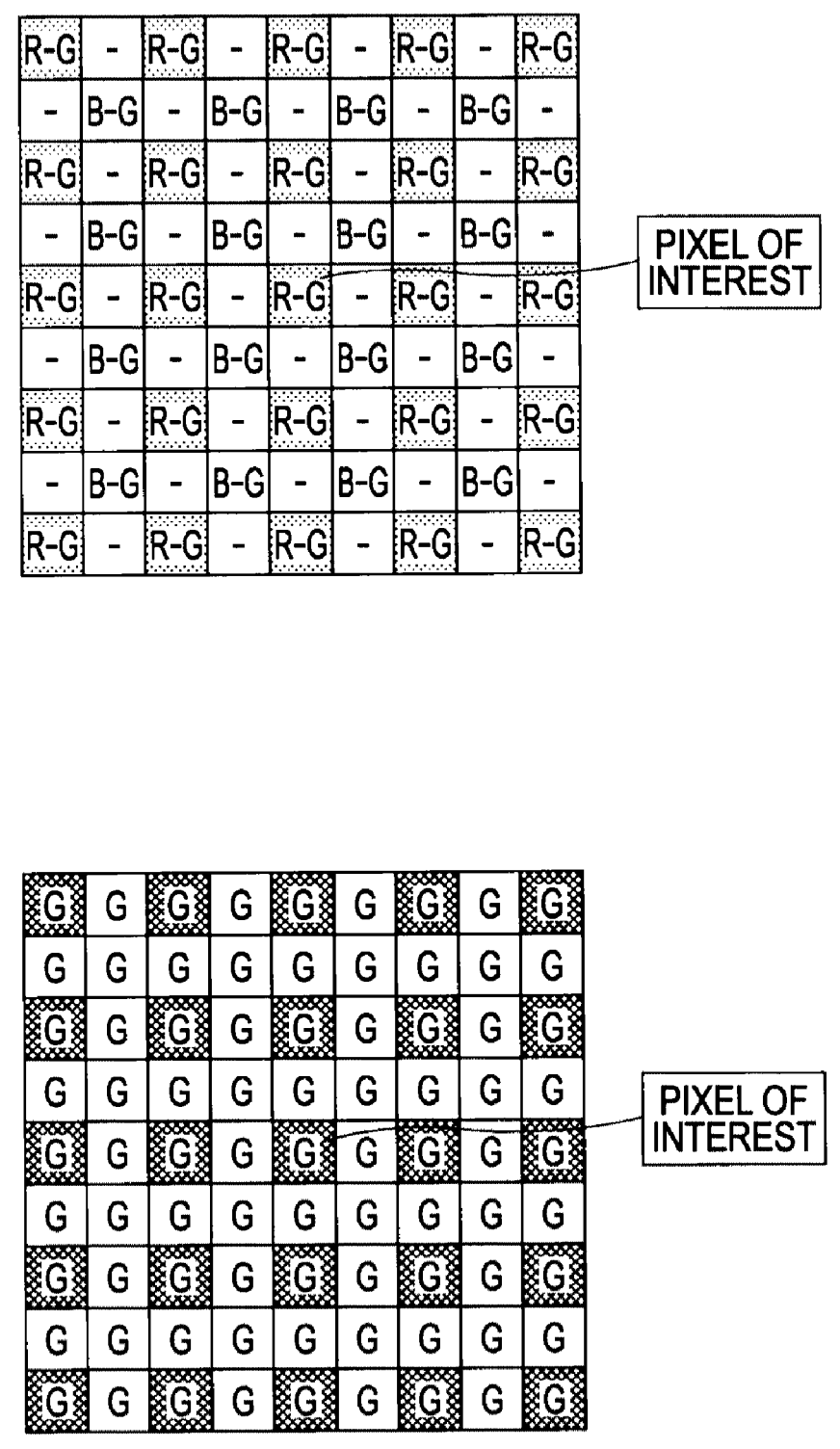

FIGS. 9A and 9B illustrate the processing performed by an $\epsilon$ filter for a color difference signal. In the color difference noise reduction processing unit 6352 shown in FIG. 7, as shown in FIG. 9A, only color difference signals (R−G) and (R−B) output from the color difference generation unit 632 can be processed. However, in order to solve the above-described color bleed or color missing problems occurring on a edge portion, as shown in FIG. 9B, the level difference of a G signal between a pixel of interest and the surrounding pixel is obtained as for the color difference signal. Thereafter, it is determined whether the level difference of a G signal between a pixel of interest and the surrounding pixel is within a predetermined threshold value range. Thus, whether the surrounding signal is used for averaging processing is determined.

Accordingly, as indicated by a dotted arrow in FIG. 7, the G signal output from the G interpolation unit 631 is further supplied to the color difference noise reduction processing unit 6352. When the level difference of each of color difference signals (R−G) and (R−B) between a pixel of interest and the surrounding pixel is within a noise threshold value range and the level difference of a G signal between the pixel of interest and the surrounding pixel is within a noise threshold value range, the color difference signal of the surrounding pixel is used for averaging color difference signals for the pixel of interest.

Conversely, even when the level difference of each of color difference signals (R−G) and (R−B) between a pixel of interest and the surrounding pixel is within a noise threshold value range, the color difference signal of the surrounding pixel is not used for averaging color difference signals for the pixel of interest if the level difference of a G signal between the pixel of interest and the surrounding pixel is outside a noise threshold value range.

As described above, when a color noise component is removed from a color difference signal using an $\epsilon$ filter, the color noise component can be accurately removed, and therefore, the color of an image can be properly reproduced by taking into account a G signal.

Note that, even when color noise is reduced using only the color difference signals (R−G) and (R−B) without taking into account a G signal, the color noise is sufficiently removed. Accordingly, a G signal may be taken into account only for products that particularly focus on a high image quality.

In addition, the color difference noise reduction processing unit 6352 may allow a user to select whether a G signal is used or not. In such a case, the key operation unit 121 receives selection whether a G signal is used or not. In accordance with the selection, the control unit 110 can control processing performed by the noise reduction processing unit 635 of the demosaic processing unit 1063 in the camera signal processing unit 106.

The levels of noise of different colors are different. Accordingly, different values are used for the noise threshold value of the (R−G) signal, (R−B) signal, and G signal. The level of noise is proportional to a front stage gain, such as the gain of the WB control unit 1062. Accordingly, it is desirable that the noise threshold value is controlled in accordance with the front stage gain. In addition, a plurality of values may be prestored in the ROM 112 for each of the (R−G) signal, (R−B) signal, and G signal, and the user may select one of the values using the key operation unit 121. Furthermore, the user can set or change the noise threshold value for each of the (R−G) signal, (R−B) signal, and G signal using the key operation unit 121.

Importance of Position of Noise Reduction Processing Unit 635

As described in FIG. 6, in the present embodiment, the noise reduction processing unit 635 is disposed immediately downstream of the G interpolation unit 631 and the color difference generation unit 632. This is because, as described above, a complicated filter for interpolation of the demosaic process is not applied to color noise mixed into a color difference signal since this position is a position at which the color difference signals (R−G) and (R−B) can be used immediately after these signals are generated. Accordingly, the color noise is effectively reduced. This reason is described in more detail next with reference to FIGS. 10 and 11.

Figure 10:
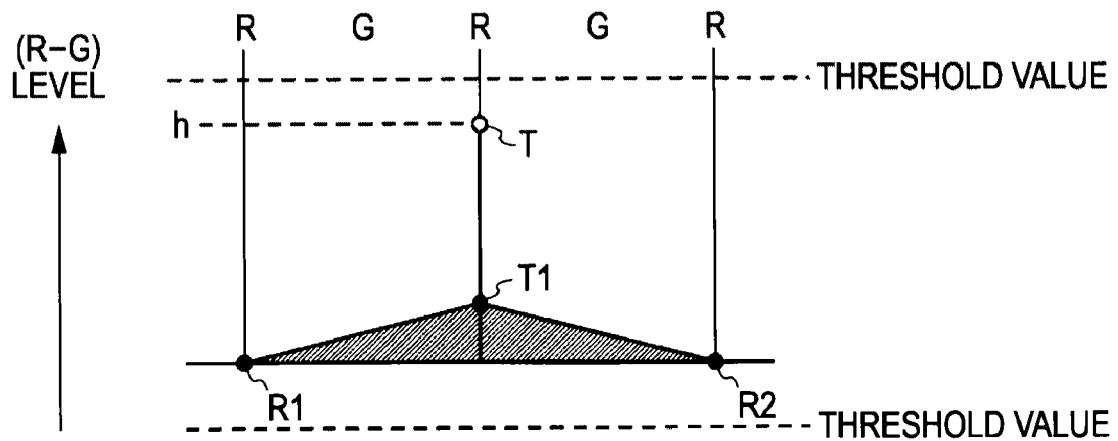
FIG. 10 schematically illustrates a noise reduction process performed on a color difference signal using an ε filter before a color difference is interpolated.

FIG. 10 schematically illustrates a noise reduction process performed on a color difference signal using an ϵ filter before a color difference is interpolated. That is, FIG. 10 illustrates an exemplary processing performed by the noise reduction processing unit 635 disposed at the position shown in FIG. 6 in order to remove a color noise component from a color difference signal. In this signal, noise is mixed into a flat portion of an image where the picture does not change.

In FIG. 10, the letters "R", "G", "R", "G", and "R" written at the top represent pixels having an R signal and their positions and pixels having a G signal and their positions. Accordingly, an (R−G) signal is generated for the pixel having an R signal. In addition, as described above, when color noise is removed using an ϵ filter, the pixel of interest T serves as a reference. If the level difference between the pixel of interest T and the surrounding pixel having a color difference signal of the same color is within a predetermined threshold value range, the surrounding pixel is used for averaging the level of the pixel of interest T.

Accordingly, as shown in FIG. 10, when the signal level of the pixel of interest T is used for a reference, the pixel R1 and the pixel R2 having a (R−G) signal and a level difference between the pixel of interest T and the surrounding pixel within a predetermined threshold value range are used for averaging the level of the pixel of interest T. Therefore, when the pixel of interest T is smoothed using these pixels R1 and R2, the pixel of interest T located at a relatively high signal level h is moved to a pixel of interest T1 after noise reduction is performed. Thus, a color noise component included in the pixel of interest T can be significantly reduced.

Figure 11:
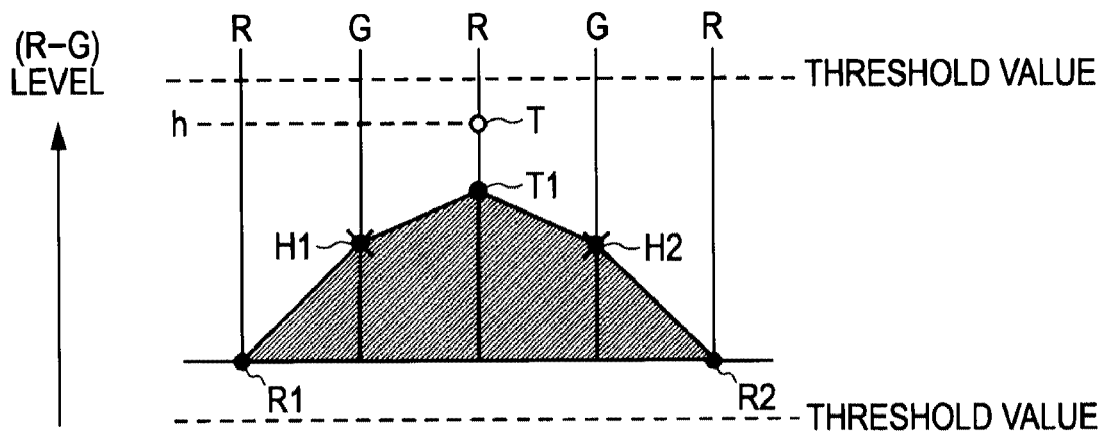
FIG. 11 schematically illustrates a noise reduction process performed on a color difference signal using an ε filter after a color difference is interpolated.

In contrast, FIG. 11 schematically illustrates a noise reduction process performed on a color difference signal using an ϵ filter after a color difference is interpolated. That is, FIG. 11 schematically illustrates an exemplary processing performed at a location downstream of the color difference interpolation unit 633 shown in FIGS. 3 and 6 in order to remove a color noise component from a color difference signal.

In FIG. 11, the letters "R", "G", "R", "G", and "R" written at the top represent pixels having an R signal and their positions and pixels having a G signal and their positions. Accordingly, an (R−G) signal is generated for the pixel having an R signal. In addition, as described in FIG. 3, in the color difference interpolation unit 633, a color difference signal (R−G) is generated for the pixel having a G signal on the basis of the color difference signals of the same color as well.

Accordingly, in FIG. 11, as shown by pixels H1 and H2, a color difference signal (R−G) is generated by interpolation even for a pixel having a G signal before a color noise reduction process is performed. Subsequently, if a noise reduction process is performed using an ϵ filter, the level differences of the pixels H1 and H2, each having already-interpolated signals, from the level of the pixel of interest T range within the threshold value range. Therefore, if a noise reduction process is performed using an ϵ filter and these pixels, it is difficult to reduce a large amount of noise component, as shown by a pixel of interest T1 in FIG. 11 after a noise reduction process is performed, since the pixels H1 and H2 already subjected to an interpolation process are used.

As can be seen from comparison of FIG. 10 and FIG. 11, an area surrounded by the pixel of interest T1 after a noise reduction process (a smoothing process) is performed, the surrounding pixels used for smoothing the pixel of interest T, and the abscissa in FIG. 10 is smaller than that in FIG. 11. This area represents an approximate amount of the noise component remaining. Accordingly, the comparison indicates that a more amount of color noise component can be reduced when a noise reduction process using an ϵ filter is performed on a color difference signal before a color difference interpolation is performed.

While the above description has been made with reference to a color difference signal (R−G), the same result can be obtained for a color difference signal (B−G).

Therefore, according to the present embodiment, as shown in FIG. 6, the image pickup apparatus 100 includes the noise reduction processing unit 635 immediately downstream of the color difference generation unit 632.

Second Exemplary Configuration and Overview of Processing of Demosaic Processing Unit 1063 (Bayer Arrangement)

Figure 12:
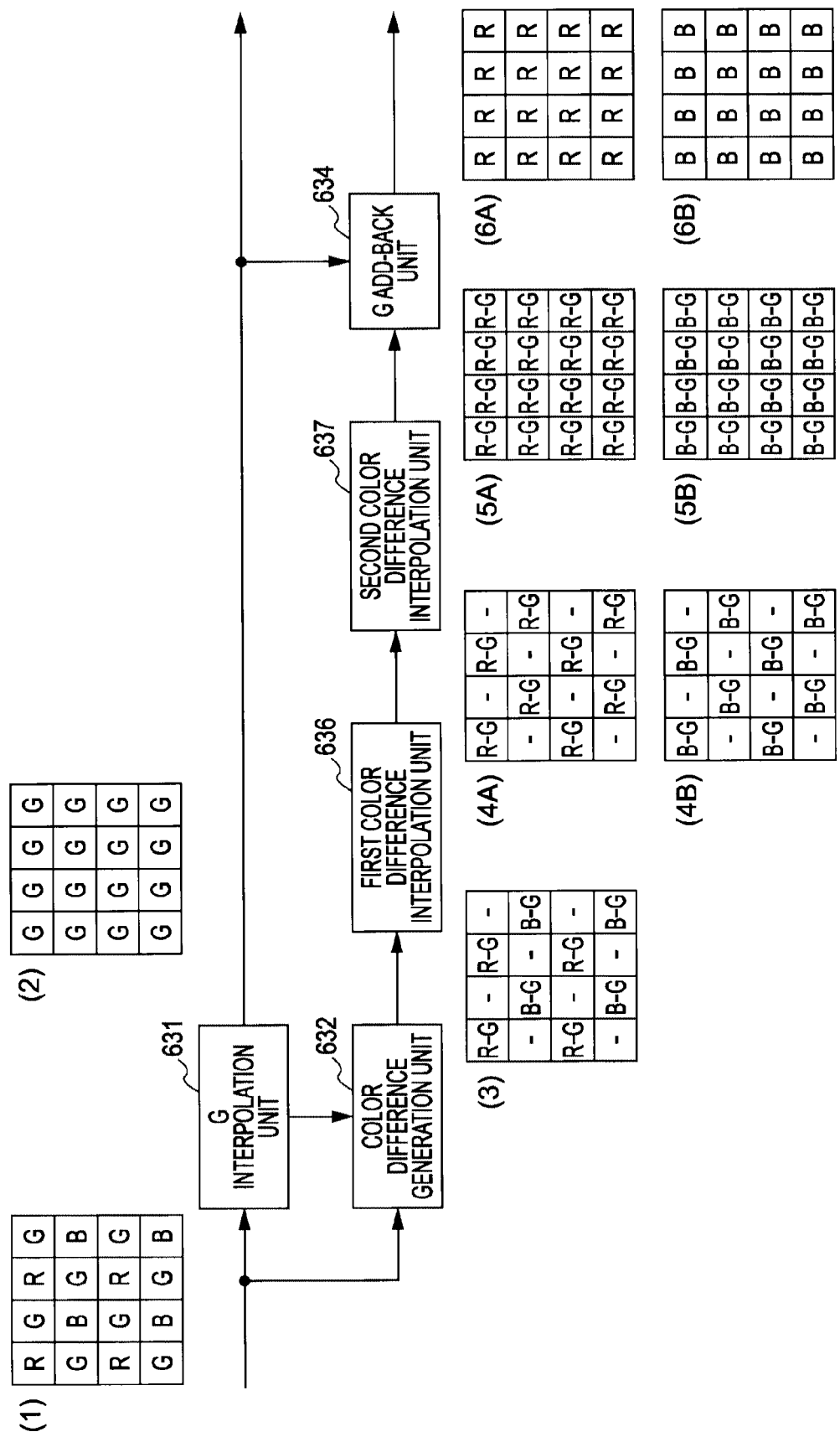
FIG. 12 is a block diagram illustrating a second exemplary configuration and the overview of processing performed by the demosaic processing unit according to the first embodiment.

FIG. 12 is a block diagram illustrating a second exemplary configuration and the overview of processing performed by the demosaic processing unit 1063 of the camera signal processing unit 106 shown in FIG. 2. As shown in FIG. 12, the demosaic processing unit 1063 has a configuration similar to that of the demosaic processing unit 1063 shown in FIG. 3, except that the demosaic processing unit 1063 includes a first color difference interpolation unit 636 and a second color difference interpolation unit 637.

Accordingly, for simplicity, the same numbering will be used in describing a second demosaic processing unit shown in FIG. 12 as was utilized above in describing the first demosaic processing unit 1063 in FIG. 3, and therefore, the detail descriptions thereof are not repeated. In addition, like the demosaic processing unit 1063 shown in FIG. 3, the color coding of a color filter of a solid-state image sensing device of the image sensing device unit 102 is the Bayer arrangement.

In the demosaic processing unit 1063 shown in FIG. 12, the function of the color difference interpolation unit 633 of the demosaic processing unit 1063 shown in FIG. 3 is divided into two. That is, the color difference interpolation function is realized by the first color difference interpolation unit 636 and the second color difference interpolation unit 637. The color difference generation unit 632 generates and outputs a (R−G) signal for a pixel having an R signal and a (B−G) signal for a pixel having a B signal, as shown by a pattern (3) in FIG. 12.

The color difference signals (R−G) and (B−G) generated by the color difference generation unit 632 are supplied to the first color difference interpolation unit 636. As shown by patterns (4A) and (4B) in FIG. 12, a (B−G) signal is generated by interpolation for even a pixel for which an (R−G) signal is generated using surrounding (B−G) signals. In addition, an (R−G) signal is generated by interpolation for even a pixel for which a (B−G) signal is generated using the surrounding (R−G) signals.

Subsequently, the second color difference interpolation unit 637 interpolates a color difference signal (R−G) (see pattern (5A) in FIG. 12) and a color difference signal (B−G) (see pattern (5B) in FIG. 12) for a pixel having no color difference signal from the surrounding pixels having color difference signals, that is, the color difference signals generated through interpolation by the first color difference interpolation unit 636 (see patterns (4A) and (4B) in FIG. 12). The subsequent processing performed by the G add-back unit 634 is the same as that described in FIG. 3.

In the demosaic processing unit 1063 having the configuration in which a color difference interpolation unit is divided into the first color difference interpolation unit 636 and the second color difference interpolation unit 637, a noise reduction processing unit is disposed between the first color difference interpolation unit 636 and the second color difference interpolation unit 637.

Exemplary Configuration of Demosaic Processing Unit 1063

Figure 13:
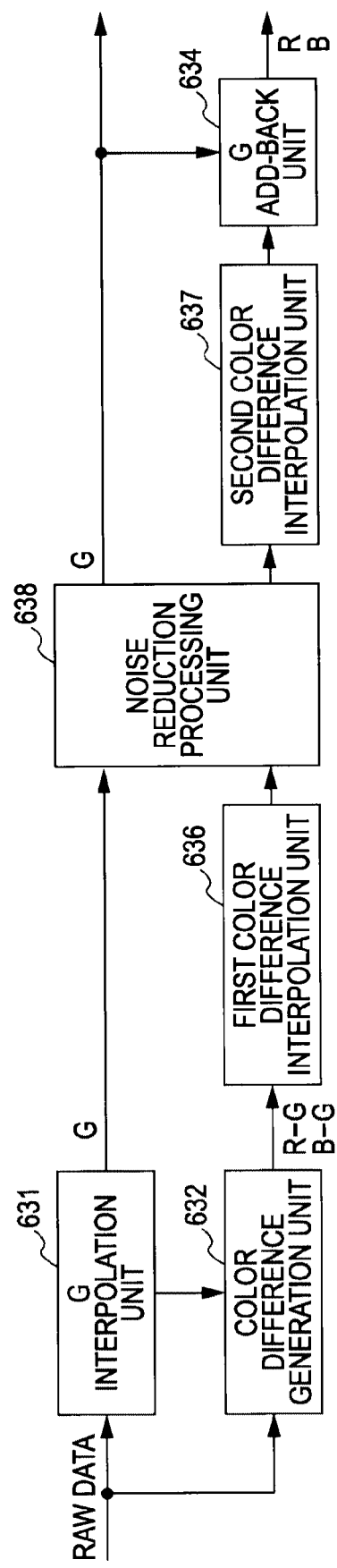
FIG. 13 is a block diagram of a second exemplary configuration of a demosaic processing unit including a noise reduction processing unit according to the first embodiment.

FIG. 13 is a block diagram of the demosaic processing unit 1063 configured described in FIG. 12 and including a noise reduction processing unit 638. As shown in FIG. 13, in this example, the demosaic processing unit 1063 includes the noise reduction processing unit 638 between the first color difference interpolation unit 636 and the second color difference interpolation unit 637.

As shown in FIG. 13, any circuit block is not provided downstream of the G interpolation unit 631. Accordingly, the processing of a G signal performed in the demosaic processing unit 1063 shown in FIG. 13 is similar to the processing performed in the demosaic processing unit 1063 shown in FIG. 6. However, a color-difference-signal noise reduction process is performed on the color difference signal shown in patterns (4A) and (4B), which is an intermediately interpolated color difference signal.

In the noise reduction processing unit 638 shown in FIG. 13, a noise reduction process is performed on color difference signals (R−G) and (B−G) which are slightly subjected to a complicated filter in an interpolation process, as compared with the processing performed in the noise reduction processing unit 635 shown in FIG. 6. However, since two color difference signals (R−G) and (B−G) are present in the same pixel position, color noise can be effectively reduced without deteriorating the edge of a picture, as compared with the processing performed in the noise reduction processing unit 635 shown in FIG. 6.

Exemplary Configuration of Noise Reduction Processing Unit 638

Figure 14:
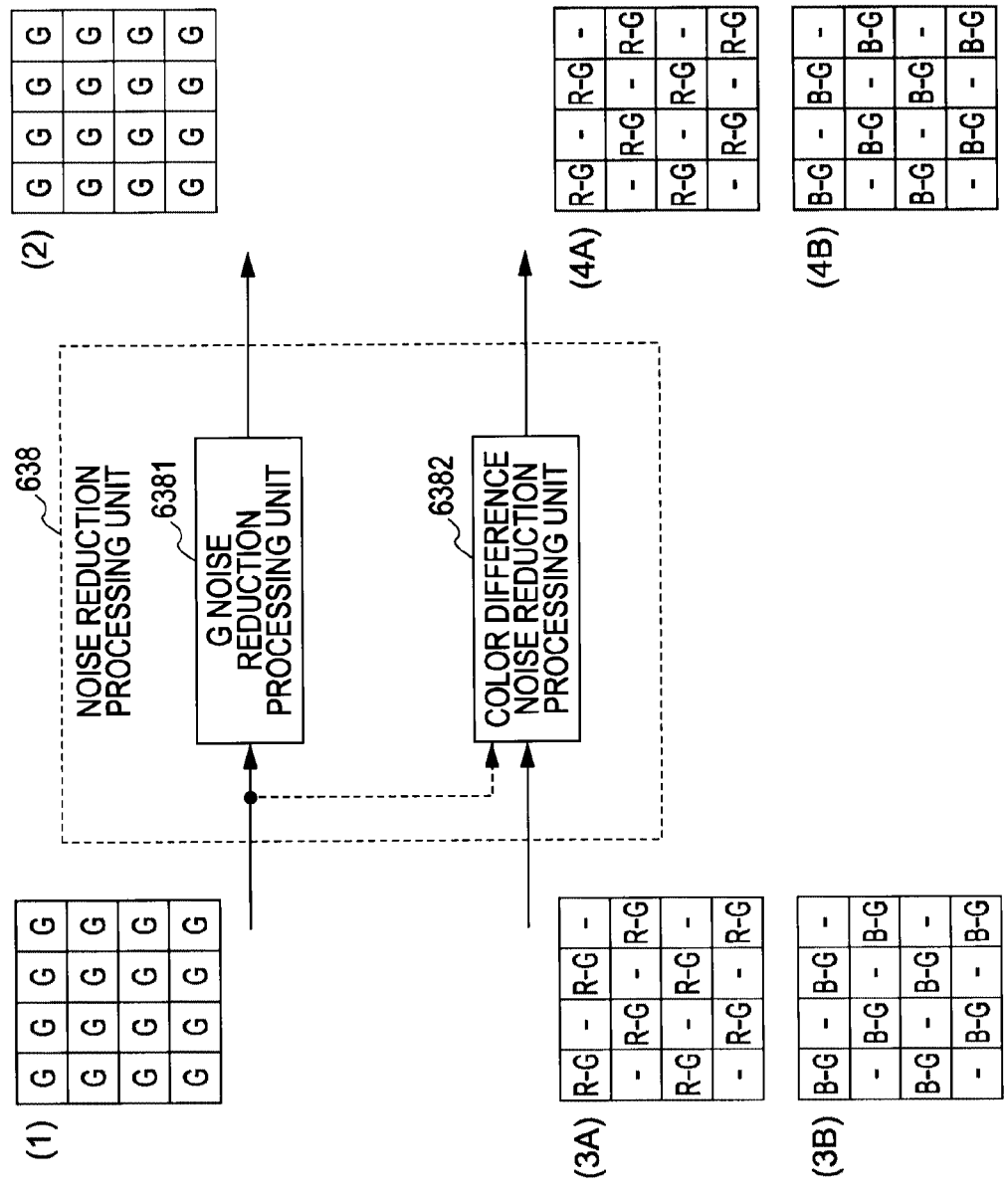
FIG. 14 is a block diagram illustrating an exemplary configuration of the noise reduction processing unit shown in FIG. 13.

FIG. 14 is a block diagram illustrating an exemplary configuration of the noise reduction processing unit 638 of the demosaic processing unit 1063 shown in FIG. 13. Like the noise reduction processing unit 635 shown in FIG. 7, the noise reduction processing unit 638 includes a G noise reduction processing unit 6381 and a color difference noise reduction processing unit 6382.

Overview of Processing Performed by G Noise Reduction Processing Unit 6381

The G noise reduction processing unit 6381 processes G signals having the same form as that in the G noise reduction processing unit 6351 shown in FIG. 7. Accordingly, the processing similar to that of the G noise reduction processing unit 6351 shown in FIG. 7 is performed. That is, the G noise reduction processing unit 6381 performs a noise reduction process on a G signal using an $\epsilon$ filter. Alternatively, the G noise reduction processing unit 6381 divides a G signal into a high-frequency side (a high-frequency component) and a low-frequency side (a low-frequency component). The G noise reduction processing unit 6381 then performs a coring process and a limit process on the high-frequency component and performs a process on the low-frequency component using an $\epsilon$ filter. Thus, the G noise reduction processing unit 6381 performs different noise reduction processes on the high-frequency side and the low-frequency side.

Overview of Processing Performed by Color Difference Noise Reduction Processing Unit 6382

Like the color difference noise reduction processing unit 6352 of the noise reduction processing unit 635 shown in FIG. 7, the color difference noise reduction processing unit 6382 performs a color noise reduction process using a color difference signal. However, the processing is slightly different from the processing performed by the color difference noise reduction processing unit 6352, as described below.

That is, in the color difference noise reduction processing unit 6382 of the noise reduction processing unit 638 shown in FIG. 14, when reducing noise of an (R−G) signal, in addition to determining whether the level difference of an (R−G) signal between a pixel of interest T and the surrounding pixel is within a noise threshold value range, the color difference noise reduction processing unit 6382 determines whether the level difference of a (B−G) signal between the pixel of interest T and the surrounding pixel located at the same position as that of the (R−G) signal is within a noise threshold value range. If the level difference is within the noise threshold value range, the color difference noise reduction processing unit 6382 selects the surrounding pixel of the (R−G) signal as a target of the averaging process.

Similarly, when reducing noise of a (B−G) signal, in addition to determining whether the level difference of a (B−G) signal between a pixel of interest T and the surrounding pixel is within a noise threshold value range, the color difference noise reduction processing unit 6382 determines whether the level difference of an (R−G) signal between the pixel of interest T and the surrounding pixel located at the same position as that of the (B−G) signal is within a noise threshold value range. If the level difference is within the noise threshold value range, the color difference noise reduction processing unit 6382 selects the surrounding pixel of the (B−G) signal as a target of the averaging process.

In this way, as shown by the patterns (4A) and (4B) in FIG. 14, the color difference signals having reduced color noise can be obtained from the color difference signals shown by the patterns (3A) and (3B) in FIG. 14.

In order to further accurately reduce the noise by taking into account the edge portion of a picture, the signal level of the G signal is used, as shown by a dotted arrow in FIG. 14.

That is, to reduce the noise of an (R−G) signal, when the level difference of a (B−G) signal between the pixel of interest T of the (R−G) signal and the surrounding signal is within the noise threshold value range and the level difference of a G signal between the pixel of interest T of the (R−G) signal and the surrounding signal is within the noise threshold value range, the surrounding signal of the (R−G) signal is selected as a target of the averaging process. Similarly, to reduce the noise of a (B−G) signal, an $\epsilon$ filter is applied using the (R−G) signals and the G signals in addition to the (B−G) signals.

In this way, as described for the noise reduction processing unit 635 shown in FIG. 7, in processing an edge portion of a picture, a signal component of an unwanted pixel that has a significantly different color can be removed from the targets of a smoothing process, and therefore, color bleed and color missing can be prevented.

Figures 15A, 15B, 15C:
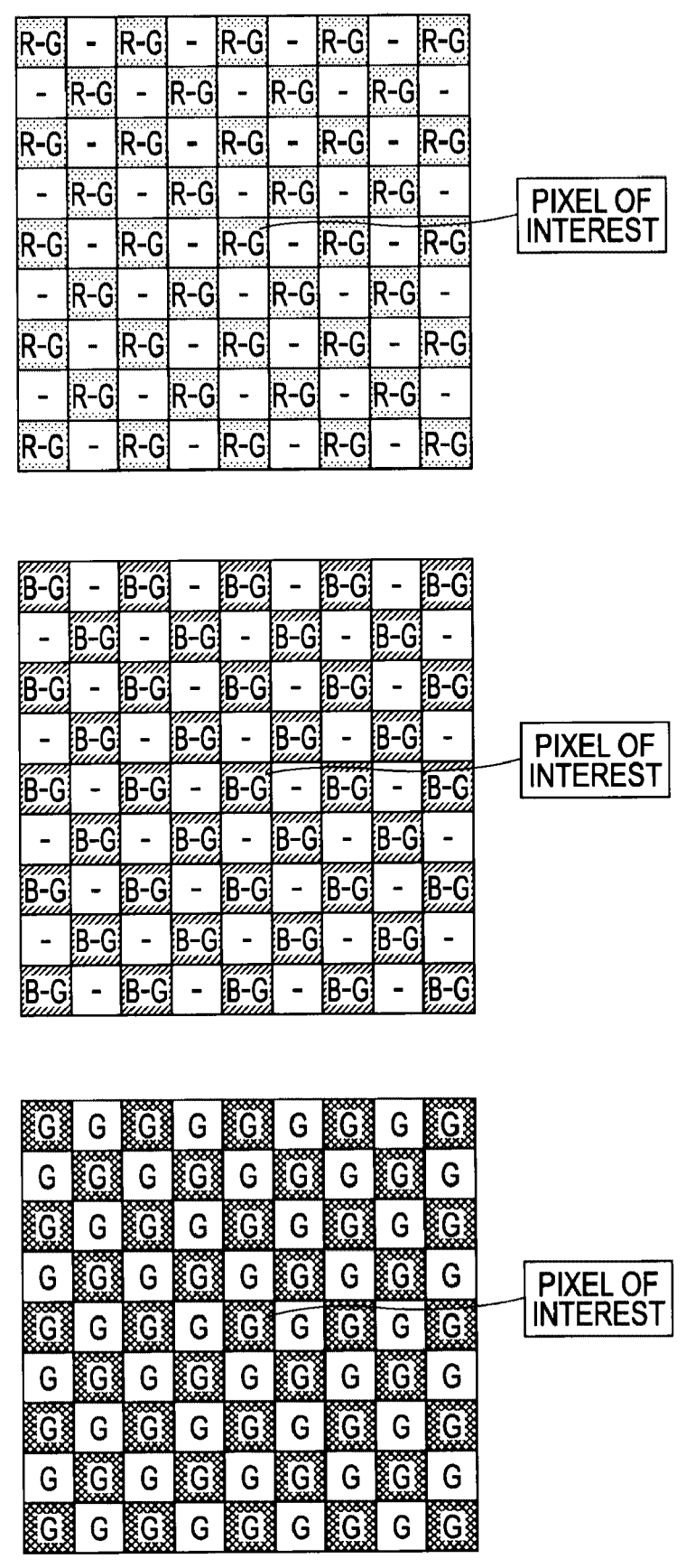

As described above, in general, in the noise reduction processing unit 638 of the demosaic processing unit 1063 used in the second example, as shown in FIGS. 15A and 15B, (R−G) signals and (B−G) signals at the same pixel locations are used in order to reduce color noise. In addition, as shown in FIG. 15C, G signals at the same pixel locations are taken into account. As a result, even when color noise is reduced using either one of the (R–G) signal and the (R–B) signal, color noise can be accurately reduced from the color difference signal by taking into account three primary colors R, G, and B.

Modification of Noise Reduction Processing Unit

Figure 16:
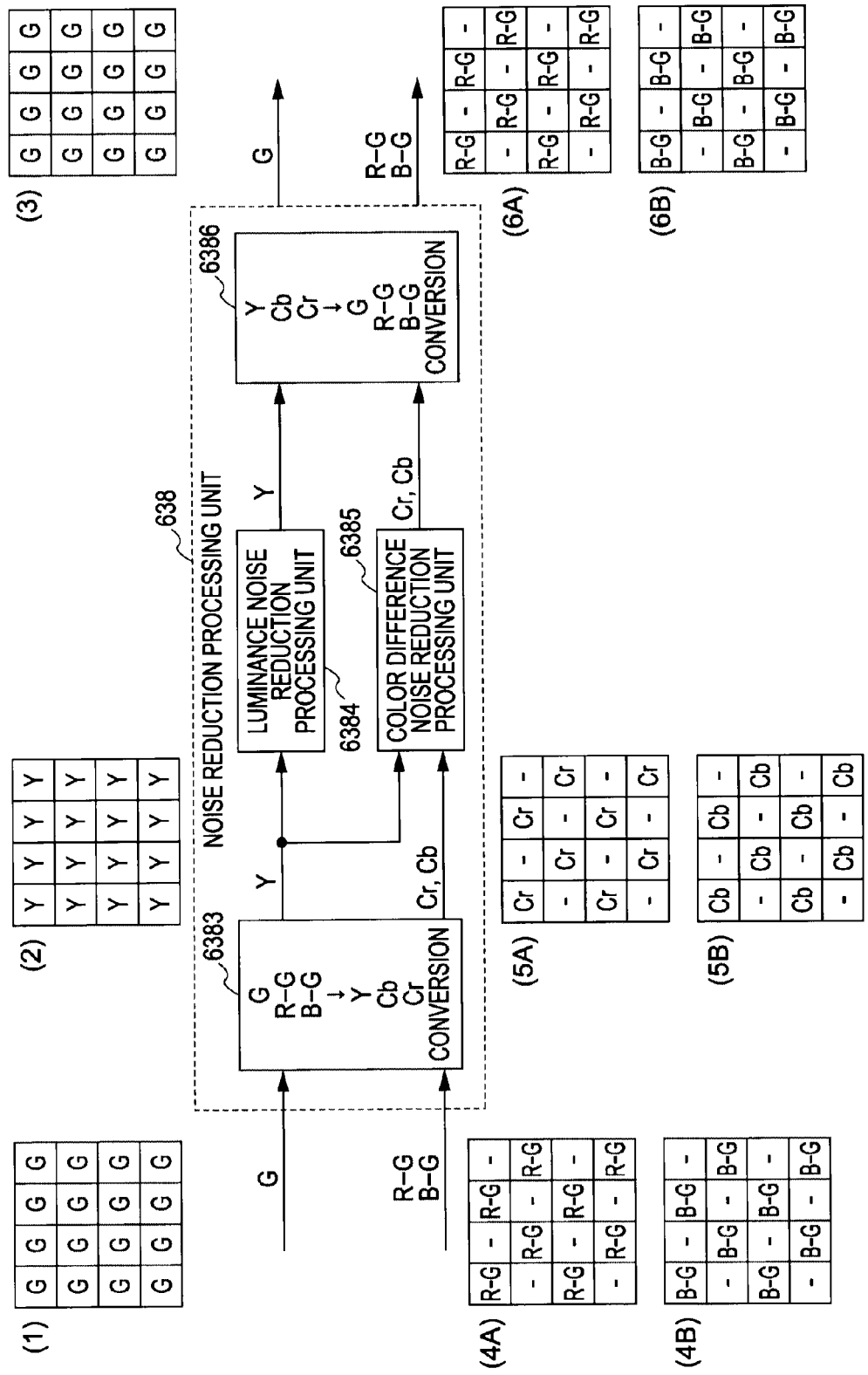
FIG. 16 is a block diagram illustrating another exemplary configuration of the noise reduction processing unit.

FIG. 16 is a block diagram illustrating another exemplary configuration of the noise reduction processing unit 638. When determining a pixel to be selected as a target of a smoothing operation in order to accurately reduce color noise, the color difference noise reduction processing unit 6382 of the noise reduction processing unit 638 shown in FIG. 14 uses not only the level difference of a color difference signal between a pixel of interest and the surrounding pixel but also the level difference of a G signal between the pixel of interest and the surrounding pixel. If each of the two level differences is within a predetermined threshold value range, the color difference noise reduction processing unit 6382 uses the surrounding pixel for the averaging processing for smoothing the level of the pixel of interest.

However, if a G signal is used, an edge between, for example, a black portion and a red portion may not be detected as an edge. That is, although a G signal has a strong luminance component, the luminance component is not a pure luminance signal. Accordingly, when a red color and a block color are represented, the both colors include the same amount of a G signal. Thus, it is difficult to detect an edge using only a G signal.

Therefore, in another example of the noise reduction processing unit 638 shown in FIG. 16, a luminance signal Y and color difference signals Cb and Cr are generated from a G signal and color difference signals (R–G) and (B–G). Thereafter, noise reduction process is performed on the color difference signals Cb and Cr by further using the luminance signal Y. Subsequently, the luminance signal Y and the color difference signals Cb and Cr are converted back to the original G signal and the color difference signals (R–G) and (B–G).

That is, as shown in FIG. 16, the noise reduction processing unit 638 in this example includes a Y/C conversion unit 6383, a luminance noise reduction processing unit 6384, a color difference noise reduction processing unit 6385, and a reverse Y/C conversion unit 6386. The Y/C conversion unit 6383 performs Y/C conversion in which a G signal and color difference signals (R–G) and (B–G) are converted into a luminance signal Y and color difference signals Cb and Cr. The luminance noise reduction processing unit 6384 performs a noise reduction process on the luminance signal Y. The color difference noise reduction processing unit 6385 performs a noise reduction process on the color difference signals Cb and Cr. The reverse Y/C conversion unit 6386 converts back the luminance signal Y and the color difference signals Cb and Cr having reduced noise into the original G signal and color difference signals (R–G) and (B–G).

The G signal (see a pattern (1) in FIG. 16) output from the G interpolation unit 631 and the color difference signals (R–G) (see a pattern (4A) in FIG. 16) and (B–G) (see a pattern (4B) in FIG. 16) output from the color difference generation unit 632 are supplied to the Y/C conversion unit 6383. The Y/C conversion unit 6383 then converts these signals to a luminance signal Y (see a pattern (2) in FIG. 16), a color difference signal Cb (see a pattern (5A) in FIG. 16), and a color difference signal Cr (see a pattern (5B) in FIG. 16). The luminance signal Y is then supplied to the luminance noise reduction processing unit 6384. The color difference signals Cb and Cr are then supplied to the color difference noise reduction processing unit 6385.

The luminance noise reduction processing unit 6384 performs a noise reduction process on the supplied luminance signal Y. As in the above-described example, the luminance noise reduction processing unit 6384 performs the noise reduction process using an ε filter. Alternatively, the luminance noise reduction processing unit 6384 divides the Y signal into a high-frequency side (a high-frequency component) and a low-frequency side (a low-frequency component). The luminance noise reduction processing unit 6384 then performs a coring process and a limit process on the high-frequency component and performs a process on the low-frequency component using an ε filter. Thus, the luminance noise reduction processing unit 6384 performs different noise reduction processes on the high-frequency side and a low-frequency side. The luminance signal Y subjected to the noise reduction process performed by the luminance noise reduction processing unit 6384 is supplied to the reverse Y/C conversion unit 6386.

In order to reduce the noise of the color difference signal Cb, the color difference noise reduction processing unit 6385 selects a surrounding pixel of the color difference signal Cb as a target of an averaging process if the level difference of each of a color difference signal Cr and a luminance signal Y between the pixel of the color difference signal Cb and the surrounding pixel is within the noise threshold value range. Similarly, in order to reduce the noise of the color difference signal Cr, the ε filter is applied using not only the color difference signal Cr but also the color difference signal Cb and the luminance signal Y. The color difference signals Cb and Cr subjected to the noise reduction process performed by the color difference noise reduction processing unit 6385 are supplied to the reverse Y/C conversion unit 6386.

Subsequently, the reverse Y/C conversion unit 6386 restores the G signal, the (R–G) signal, and the (B–G) signal from the supplied luminance signal Y and color difference signals Cb and Cr subjected to the noise reduction process. The reverse Y/C conversion unit 6386 then outputs the restored signals.

The conversion process performed by the Y/C conversion unit 6383 is different for a standard definition (SD) image signal and for a high definition (HD) image signal to be processed. FIG. 17 shows the computational expressions for the Y/C conversion process performed in accordance with the type of an image signal. That is, when an SD image signal is processed, a G signal, the (R–G) signal, and the (B–G) signal are converted to a luminance signal Y and color difference signals Cb and Cr using computational expressions (1), (2), and (3) shown in FIG. 17. In contrast, when an HD image signal is processed, a G signal, the (R–G) signal, and the (B–G) signal are converted to a luminance signal Y and color difference signals Cb and Cr using computational expressions (4), (5), and (6) shown in FIG. 17.

In addition, if the noise reduction processing unit 638 shown in FIG. 16 is used, a level difference of the luminance signal Y between the pixel of interest and the surrounding pixel is obtained in the color difference noise reduction processing performed by the color difference noise reduction processing unit 6385 using a ε filter, as described above. Accordingly, noise reduction can be achieved while maintaining the edge of a picture. In addition, since noise reduction can be performed on the color difference signals Cb and Cr that finally represent colors, color noise can be effectively reduced.

Furthermore, as described above, the noise reduction processing unit 638 having a configuration shown in FIG. 16 is disposed in the demosaic processing unit 1063. Accordingly, the noise reduction processing unit 638 does not significantly change the configuration of the image pickup apparatus 100 and does not impose a significant load on the control unit 110.

Still furthermore, in the noise reduction processing unit 638 having a configuration shown in FIG. 16, the luminance noise reduction processing unit 6384 further performs a noise reduction process on the luminance signal Y. However, the noise reduction process for the luminance signal Y may not be performed. After Y/C conversion is completed, the noise reduction process may be performed.

As can be seen from the configurations of the noise reduction processing unit 635 illustrated in FIG. 7 and the noise reduction processing unit 638 illustrated in FIG. 14, according to the present embodiment, it is important to determine at which location a color noise reduction process is performed. That is, color noise can be effectively reduced by removing noise from the color difference signals (R−G) and (B−G) at least at a location prior to completion of a color difference interpolation process, that is, a location immediately after a color difference is generated, as described in FIG. 7, or a location immediately after the (R−G) signal and the (B−G) signal are generated by interpolation for a pixel having an R signal and a pixel having a B signal, respectively, as described in FIG. 14.

In addition, while the foregoing embodiment has been described with reference to the case where an ε filter is used in the noise reduction process, the present invention is not limited thereto. For example, color noise can be effectively reduced even when wavelet conversion or a bilateral filter is used in the noise reduction process.

Second Embodiment

Color Filter of Clearvid Arrangement

While the foregoing embodiment has been described with reference to the case where a color filter having color coding of the Bayer arrangement is used for a solid-state image sensing device of the image sensing device unit 102 in the image pickup apparatus 100 having the configuration shown in FIG. 1, the present invention is not limited thereto. For example, the foregoing embodiment can be applied to the case where a solid-state image sensing device using another type of arrangement, such as a Clearvid arrangement, is employed.

FIGS. 18A and 18B illustrate the color coding of a color filter. As described above or as shown in FIG. 18A, the Bayer arrangement includes lines each including alternately appearing R's and G's in the horizontal direction (i.e., RGRG . . . ) and lines each including alternately appearing G's and B's in the horizontal direction (i.e., GBGB . . . ). These two types of line are alternately arranged in the vertical direction, and the numbers of G pixels, B pixels, and R pixels are in a ratio of 2:1:1.

In contrast, as shown in FIG. 18B, the area of a pixel is increased so that the sensitivity characteristic is improved, as compared with in the Bayer arrangement. In addition, by rotating each of the pixels in the arrangement by 45 degrees, a high resolution necessary for a high-definition image can be achieved. The numbers of G pixels, B pixels, and R pixels are in a ratio of, for example, 6:1:1. The present embodiment can be applied to even the case where image data output from a solid-state image sensing device including a color filter having the Clearvid arrangement is processed.

In the second embodiment, as shown in FIG. 18B, the first embodiment is applied to a demosaic processing unit of an image pickup apparatus including a solid-state image sensing device using a color filter having the Clearvid arrangement. That is, like the first embodiment, the description of the second embodiment is made with reference to an image pickup apparatus having the configuration shown in FIGS. 1 and 2. However, a solid-state image sensing device used in the image sensing device unit 102 includes a color filter having the Clearvid arrangement.

First Exemplary Configuration and Overview of Processing of Demosaic Processing Unit 1063 (Clearvid Arrangement)

Figure 19:
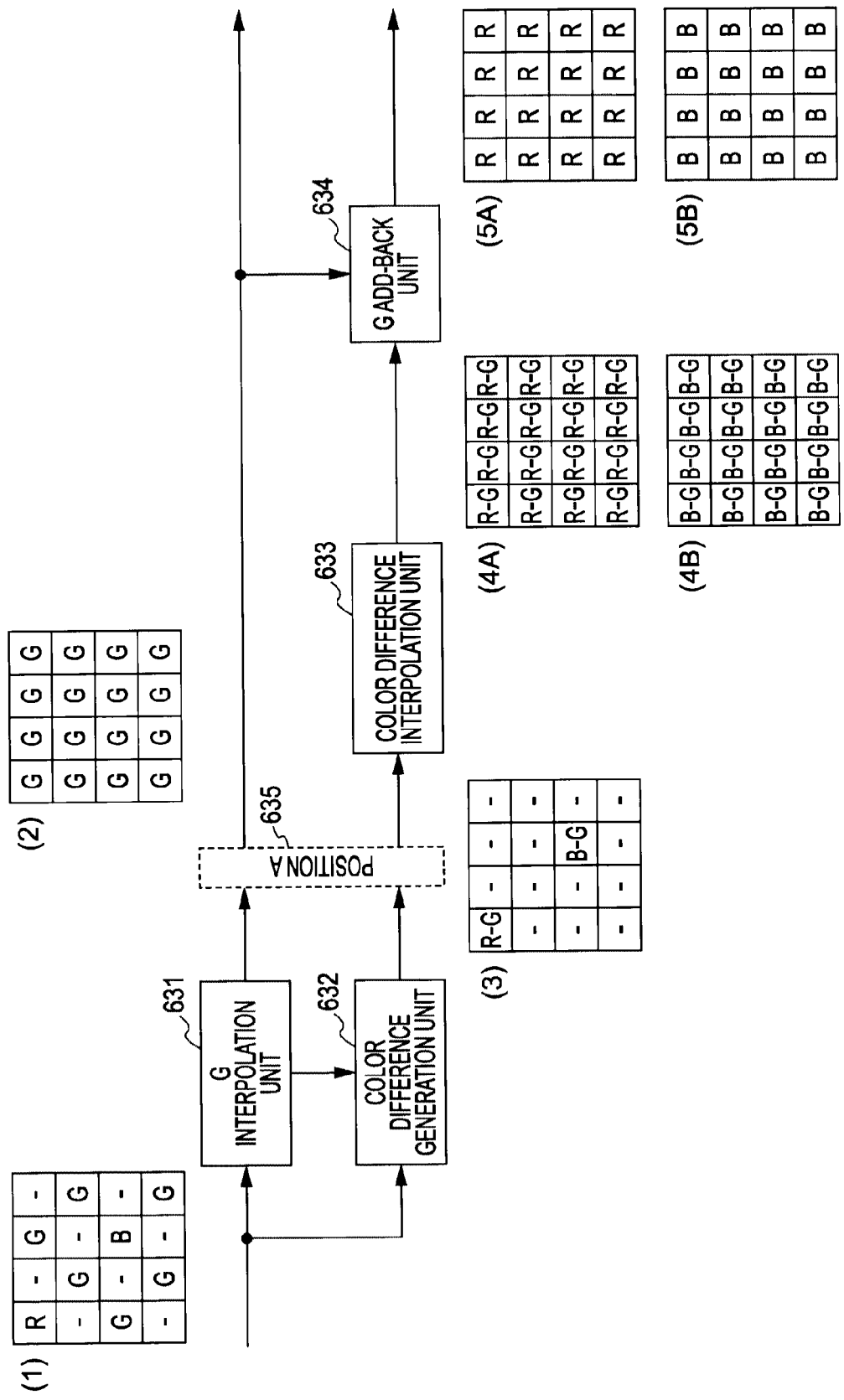
FIG. 19 is a block diagram illustrating a first exemplary configuration and the overview of processing of a demosaic processing unit according to a second embodiment.

FIG. 19 is a block diagram illustrating a first exemplary configuration and the overview of processing of the demosaic processing unit 1063 of the camera signal processing unit 106 shown in FIG. 2 when a solid-state image sensing device used in the image sensing device unit 102 of the image pickup apparatus 100 shown in FIG. 1 uses a color filter having the Clearvid arrangement. That is, FIG. 19 is a block diagram illustrating a first exemplary configuration and the overview of processing of a demosaic processing unit 1063 that processes an image signal output from a Clearvid arrangement according to the second embodiment.

As can be seen from comparison of FIG. 19 and FIG. 3, the demosaic processing unit 1063 shown in FIG. 19 has a configuration similar to that shown in FIG. 3. The demosaic processing unit 1063 includes a G interpolation unit 631, a color difference generation unit 632, a color difference interpolation unit 633, and a G add-back unit 634. In addition, the demosaic processing unit 1063 includes a noise reduction processing unit 635 disposed at a position A surrounded by a dotted line in FIG. 19, that is, immediately downstream of the G interpolation unit 631 and the color difference generation unit 632.

As shown in FIG. 19, since image data has a Clearvid arrangement is input, the formats of signals to be processed in these processing units are slightly different from those processed in the demosaic processing unit 1063 shown in FIG. 3. That is, as shown by pattern (1) in FIG. 19, image data having a Clearvid arrangement is supplied to the G interpolation unit 631 and the color difference generation unit 632 of the demosaic processing unit 1063.

The G interpolation unit 631 interpolates a G signal of each of the pixels of an image, as shown by pattern (2) in FIG. 19, on the basis of the G signals of the image data in an arrangement shown by pattern (1) in FIG. 19. In addition, as shown by pattern (3) in FIG. 19, the color difference generation unit 632 generates a color difference signal (R−G) for each of pixels having an R signal and a color difference signal (B−G) for each of pixels having a B signal.

Subsequently, as described in more detail below, the noise reduction processing unit 635, which is disposed at the position A shown in FIG. 19, reduces noise from the G signal output from the G interpolation unit 631 and the (R−G) signal and (B−G) signal output from the color difference generation unit 632. Thereafter, the (R−G) signal and (B−G) signal having reduced noise are supplied to the color difference interpolation unit 633.

The color difference interpolation unit 633 generates an (R−G) signal (see pattern (4A) in FIG. 19) and a (B−G) signal (see pattern (4B) in FIG. 19) for each of the pixels of the image on the basis of color difference signals shown by pattern (3) in FIG. 19 supplied to the color difference interpolation unit 633. The color difference interpolation unit 633 then supplies the generated signals to the G add-back unit 634. The G add-back unit 634 adds back a G signal output from the noise reduction processing unit 635 described below to the (R−G) signal (see pattern (4A) in FIG. 19) and the (B−G) signal (see pattern (4B) in FIG. 19). Thus, the G add-back unit 634 generates an R signal and a B signal for each of the pixels of the image and, subsequently, outputs the R signal and the B signal. In this way, the demosaic processing unit 1063 shown in FIG. 19 outputs the G signal (see pattern (2) in FIG. 19), the R signal (see pattern (5A) in FIG. 19), and the R signal (see pattern (5B) in FIG. 19) for each of the pixels of the image.

Exemplary Configuration of Noise Reduction Processing Unit 635

Figure 20:
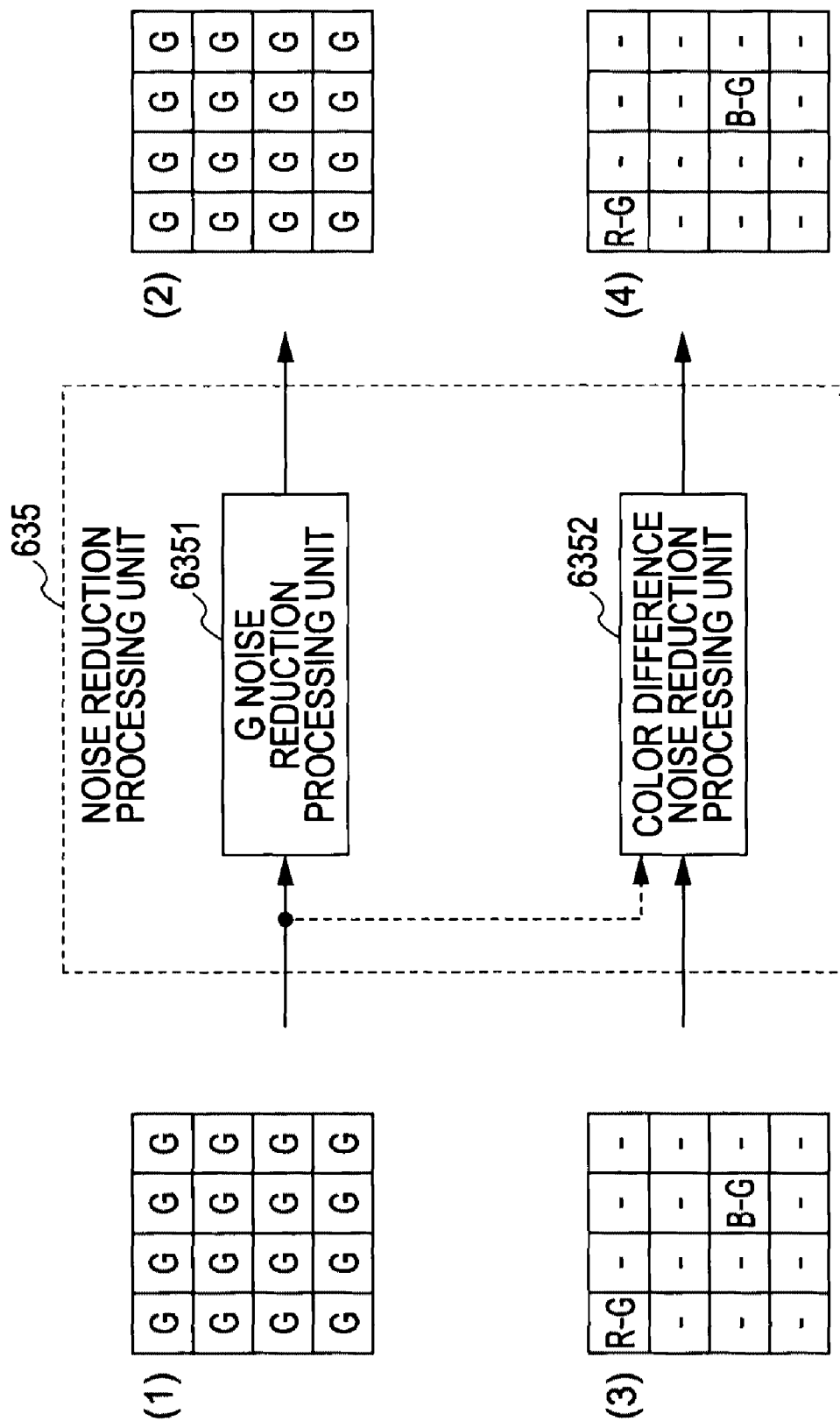
FIG. 20 is a block diagram illustrating an exemplary configuration of a noise reduction processing unit disposed at a position A shown in FIG. 19.

FIG. 20 is a block diagram illustrating an exemplary configuration of the noise reduction processing unit 635 disposed at the position A shown in FIG. 19. As shown in FIG. 20, the noise reduction processing unit 635 in this example includes a G noise reduction processing unit 6351 that reduces noise mixed into a G signal and a color difference noise reduction processing unit 6352 that reduces noise mixed into a color difference signal. That is, the noise reduction processing unit 635 shown in FIG. 20 has a configuration similar to that of the noise reduction processing unit 635 shown in FIG. 7. However, the format of a signal processed in the color difference noise reduction processing unit 6352 is different.

Overview of Processing Performed by G Noise Reduction Processing Unit 6351

The G signal of each of the pixels of the image generated through interpolation by the G interpolation unit 631 (see pattern (1) shown in FIG. 20) is sequentially supplied to the G noise reduction processing unit 6351. The G noise reduction processing unit 6351 reduces a noise component contained in the G signal using the above-described ϵ filter and outputs the G signal having reduced noise (see pattern (2) shown in FIG. 20).

Alternatively, in order to reduce noise, the G noise reduction processing unit 6351 may divide the G signal into a high-frequency side (a high-frequency component) and a low-frequency side (a low-frequency component). The G noise reduction processing unit 6351 may then perform a coring process and a limit process on the high-frequency component and perform a process on the low-frequency component using an ϵ filter. Thus, the G noise reduction processing unit 6351 may perform different noise reduction processes on the high-frequency side and the low-frequency side.

By using this alternative method, even when the level of a picture component is close to the level of a noise component due to low luminance, noise suppression (noise reduction) can be performed without causing an isolated point while maintaining the feature of the picture formed by the processed image signal.

Like the above-described example, in the demosaic processing unit 1063 in this example, in place of performing a noise reduction process in the demosaic processing unit 1063, a noise reduction process of a G signal may be performed before a demosaic process is performed. Alternatively, a noise reduction process may be performed on the Y signal (the luminance signal) subjected to a Y/C conversion performed by the Y/C conversion unit 1066 shown in FIG. 2. That is, the G noise reduction processing unit 6351 shown FIG. 7 is not necessarily provided for the noise reduction processing unit 635. In order to reduce color noise contained in an image signal efficiently, the presence of the color difference noise reduction processing unit 6352 is sufficient. The color difference noise reduction processing unit 6352 is described in more detail below.

Overview of Processing Performed by Color Difference Noise Reduction Processing Unit 6352

The color difference signal generated by the color difference generation unit 632 (see pattern (3) in FIG. 20) is supplied to the color difference noise reduction processing unit 6352. That is, as shown by pattern (3) in FIG. 20, the color difference generation unit 632 generates an (R−G) signal for a pixel having an R signal and a (B−G) signal for a pixel having a B signal and supplies the generated signals to the color difference noise reduction processing unit 6352 of the noise reduction processing unit 635. Subsequently, the color difference noise reduction processing unit 6352 removes a noise component (a color noise component) contained in the (R−G) signal and (B−G) signal using an ϵ filter for the same color.

However, if the ϵ filter is applied only on the basis of the color difference signals (R−G) and (B−G), color bleed may occur in the edge portion of a picture or a color may be missing in the high-frequency portion.

Accordingly, in the color difference noise reduction processing unit 6352, when the ϵ filter is applied, it is determined whether the level difference between a pixel of interest and the surrounding pixel is within a noise threshold value range. In addition, for the color difference signals (R−G) and (B−G), the level difference for a G signal between a pixel of interest and the surrounding pixel from which a color difference signal is obtained. If the level difference for a G signal is within a noise threshold value range, the surrounding pixel becomes the target of the averaging process of the color difference signals.

In this way, by further using the level of the G signal when a color noise component is removed from the color difference signal using an ϵ filter, the color noise component can be accurately removed, and a proper color of the image can be reproduced.

Second Exemplary Configuration and Overview of Processing of Demosaic Processing Unit 1063 (Clearvid Arrangement)

Figure 21:
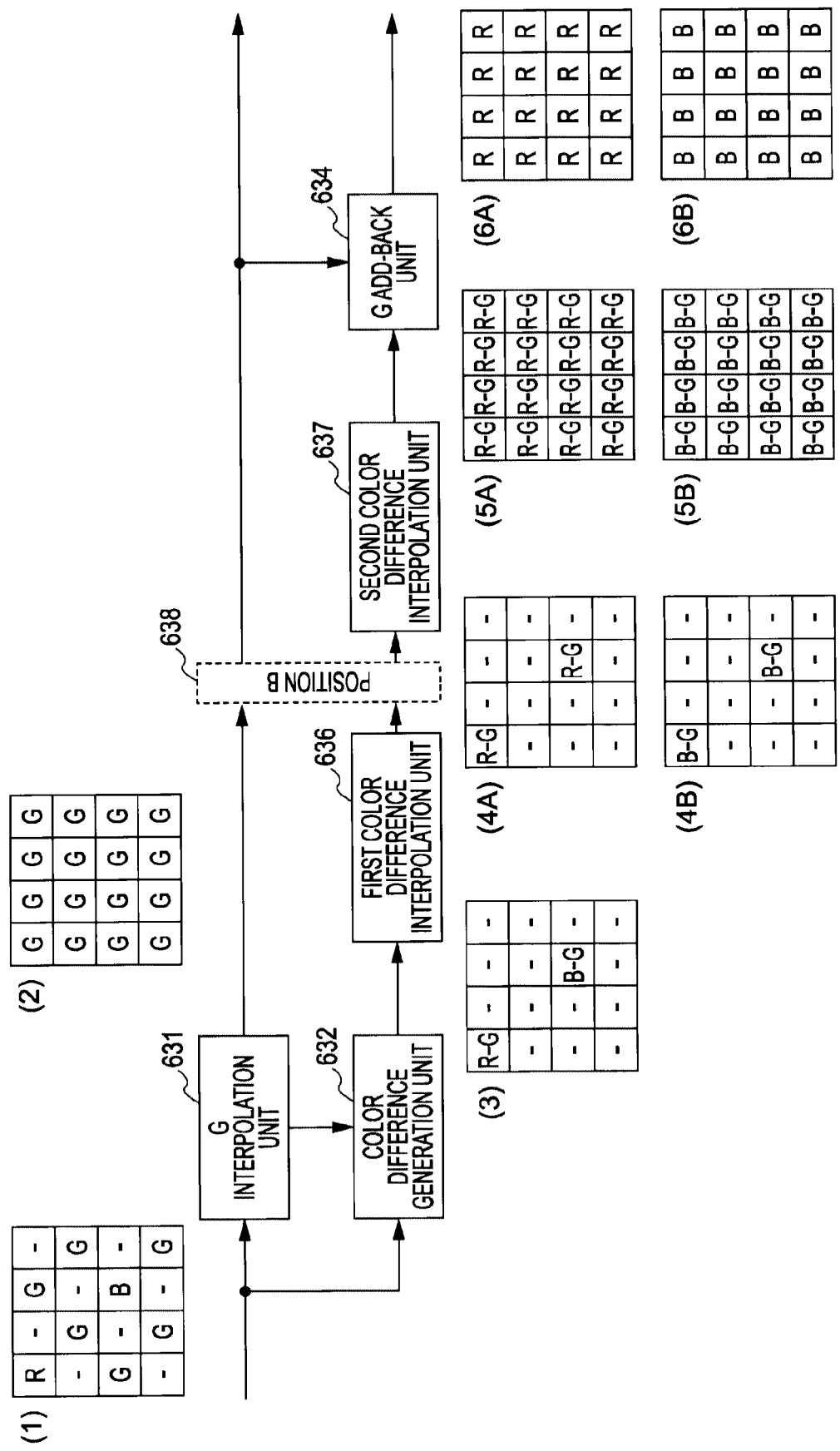
FIG. 21 is a block diagram illustrating a second exemplary configuration and the overview of processing of the demosaic processing unit according to the second embodiment.

FIG. 21 is a block diagram illustrating a second exemplary configuration and the overview of processing of the demosaic processing unit 1063 of the camera signal processing unit 106 shown in FIG. 2 when a solid-state image sensing device used in the image sensing device unit 102 of the image pickup apparatus 100 shown in FIG. 1 uses a color filter having the Clearvid arrangement. That is, FIG. 21 is a block diagram illustrating a second exemplary configuration and the overview of processing of a demosaic processing unit 1063 that processes an image signal output from a Clearvid arrangement according to the second embodiment.

As shown in FIG. 21, the demosaic processing unit 1063 in this example includes a first color difference interpolation unit 636, a second color difference interpolation unit 637, and a noise reduction processing unit 638 disposed between the first color difference interpolation unit 636 and the second color difference interpolation unit 637. The other configuration is similar to that of the demosaic processing unit 1063 shown in FIG. 19. For simplicity, the same numbering will be used in describing the second demosaic processing unit shown in FIG. 21 as was utilized above in describing the first demosaic processing unit 1063 in FIG. 19, and therefore, the detail descriptions thereof are not repeated.

In addition, in the demosaic processing unit 1063 shown in FIG. 21, the function of the color difference interpolation unit 633 of the demosaic processing unit 1063 shown in FIG. 19 is divided into two. That is, the color difference interpolation function is realized by the first color difference interpolation unit 636 and the second color difference interpolation unit 637. The color difference generation unit 632 generates and outputs an (R−G) signal for a pixel having an R signal and a (B−G) signal for a pixel having a B signal, as shown by a pattern (3) in FIG. 21.

The color difference signals (R−G) and (B−G) generated by the color difference generation unit 632 are supplied to the first color difference interpolation unit 636. As shown by patterns (4A) and (4B) in FIG. 21, a (B−G) signal is generated by interpolation for even a pixel for which an (R−G) signal is generated using surrounding (B−G) signals. In addition, an (R−G) signal is generated by interpolation for even a pixel for which a (B−G) signal is generated by interpolating the surrounding (R−G) signals.

Subsequently, the second color difference interpolation unit 637 interpolates a color difference signal (R−G) (see pattern (5A) in FIG. 21) and a color difference signal (B−G) (see pattern (5B) in FIG. 21) for a pixel having no color difference signal from the surrounding pixels having color difference signals, that is, the color difference signals generated through interpolation by the first color difference interpolation unit 636 (see the patterns (4A) and (4B) in FIG. 21). The subsequent processing performed by the G add-back unit 634 is the same as that described in FIG. 19.

In the demosaic processing unit 1063 having the configuration in which a color difference interpolation unit is divided into the first color difference interpolation unit 636 and the second color difference interpolation unit 637, the noise reduction processing unit 638 is disposed between the first color difference interpolation unit 636 and the second color difference interpolation unit 637.

Exemplary Configuration of Noise Reduction Processing Unit 638

Figure 22:
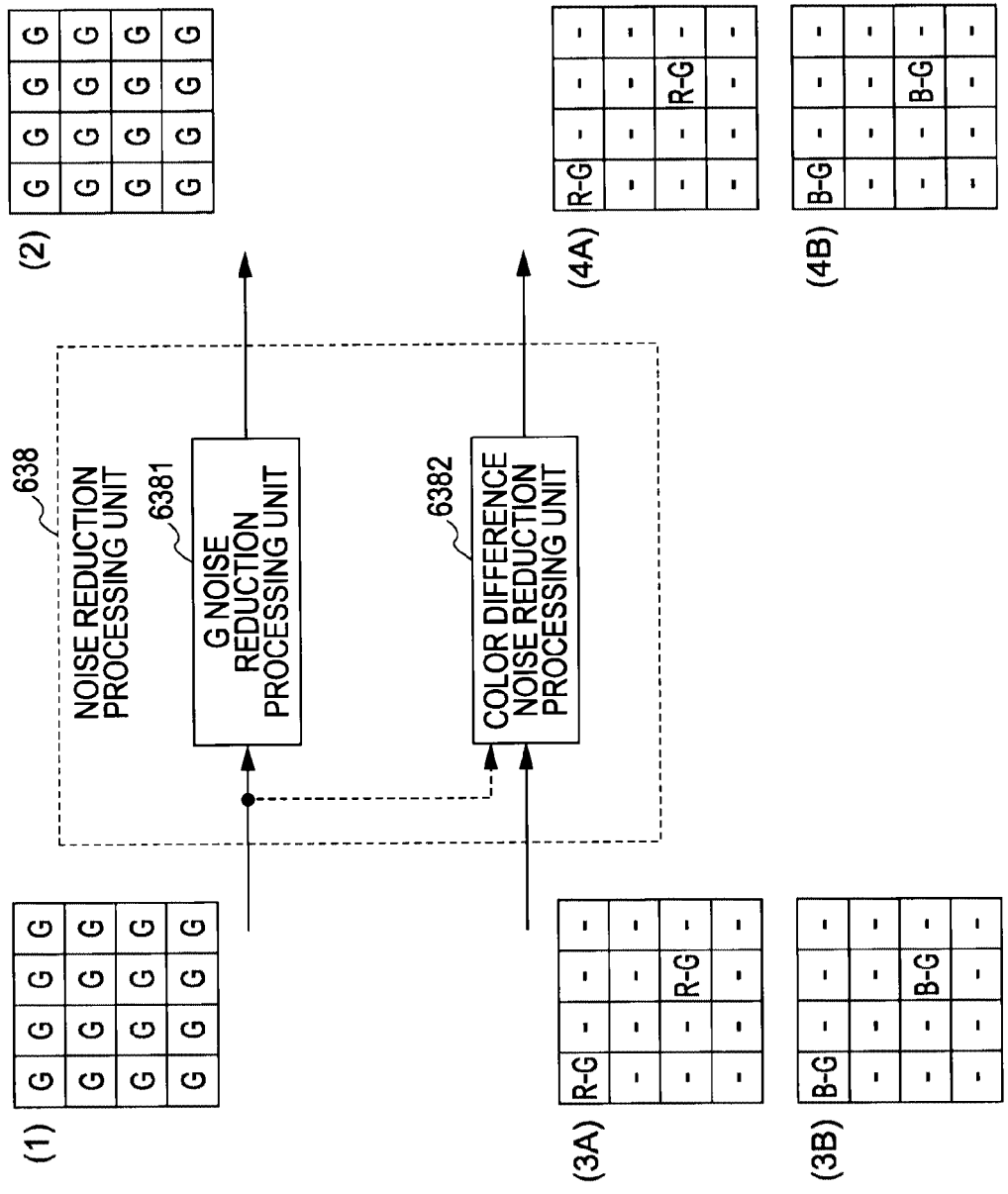
FIG. 22 is a block diagram of an exemplary configuration of a noise reduction processing unit disposed at a position B shown in FIG. 21.

FIG. 22 is a block diagram of an exemplary configuration of the noise reduction processing unit 638 disposed at the position B shown in FIG. 21. Like the noise reduction processing unit 635 shown in FIG. 20, the noise reduction processing unit 638 includes a G noise reduction processing unit 6381 and a color difference noise reduction processing unit 6382.

Overview of Processing Performed by G Noise Reduction Processing Unit 6381

The G noise reduction processing unit 6381 processes G signals having the same form as that in the G noise reduction processing unit 6351 shown in FIG. 20. Accordingly, processing similar to that of the G noise reduction processing unit 6351 shown in FIG. 20 is performed. That is, the G noise reduction processing unit 6381 performs a noise reduction process on a G signal using an ε filter. Alternatively, the G noise reduction processing unit 6381 divides a G signal into a high-frequency side (a high-frequency component) and a low-frequency side (a low-frequency component). The G noise reduction processing unit 6381 then performs a coring process and a limit process on the high-frequency component and performs a process on the low-frequency component using an ε filter. Thus, the G noise reduction processing unit 6381 performs different noise reduction processes on the high-frequency side and the low-frequency side.

Overview of Processing Performed by Color Difference Noise Reduction Processing Unit 6382

Like the color difference noise reduction processing unit 6352 of the noise reduction processing unit 635 shown in FIG. 20, the color difference noise reduction processing unit 6382 performs a color noise reduction process using a color difference signal. However, the processing is slightly different from the processing performed by the color difference noise reduction processing unit 6352 shown in FIG. 20, as described below.

That is, in the color difference noise reduction processing unit 6382 of the noise reduction processing unit 638 shown in FIG. 22, when reducing noise of an (R−G) signal, in addition to determining whether the level difference of an (R−G) signal between a pixel of interest T and the surrounding pixel is within a noise threshold value range, the color difference noise reduction processing unit 6382 determines whether the level difference of a (B−G) signal between the pixel of interest T and the surrounding pixel located at the same position as that of the (R−G) signal is within a noise threshold value range. If the level difference is within the noise threshold value range, the color difference noise reduction processing unit 6382 selects the surrounding pixel of the (R−G) signal as a target of the averaging process.

Similarly, when reducing noise of a (B−G) signal, in addition to determining whether the level difference of a (B−G) signal between a pixel of interest T and the surrounding pixel is within a noise threshold value range, the color difference noise reduction processing unit 6382 determines whether the level difference of an (R−G) signal between the pixel of interest T and the surrounding pixel located at the same position as that of the (B−G) signal is within a noise threshold value range. If the level difference is within the noise threshold value range, the color difference noise reduction processing unit 6382 selects the surrounding pixel of the (B−G) signal as a target of the averaging process.

In this way, as shown by the patterns (4A) and (4B) in FIG. 22, the color difference signals having reduced color noise can be obtained from the color difference signals shown by the patterns (3A) and (3B) in FIG. 22.

In order to further accurately reduce the noise by taking into account the edge portion of a picture, the signal level of the G signal is used, as shown by a dotted arrow in FIG. 22.

That is, to reduce the noise of an (R−G) signal, when the level difference of a (B−G) signal between the pixel of interest T of the (R−G) signal and the surrounding signal is within the noise threshold value range and the level difference of a G signal between the pixel of interest T of the (R−G) signal and the surrounding signal is within the noise threshold value range, the surrounding signal of the (R−G) signal is selected as a target of the averaging process. Similarly, to reduce the noise of a (B−G) signal, an ε filter is applied using the (R−G) signals and the G signals in addition to the (B−G) signals.

In this way, as described for the noise reduction processing unit 635 shown in FIG. 7, in processing an edge portion of a picture, a signal component of an unwanted pixel that has a significantly different color can be removed from the targets of a smoothing process, and therefore, color bleed and color missing can be prevented.

Other Configurations of Camera Signal Processing Unit

The camera signal processing unit 106 of the image pickup apparatus 100 according to the above-described embodiments has the configuration shown in FIG. 2. The demosaic processing unit 1063 of the camera signal processing unit 106 reduces color noise. However, another noise reduction process may be performed upstream of the demosaic processing unit 1063 in addition to the color noise reduction process performed by the demosaic processing unit 1063.

Figure 23:
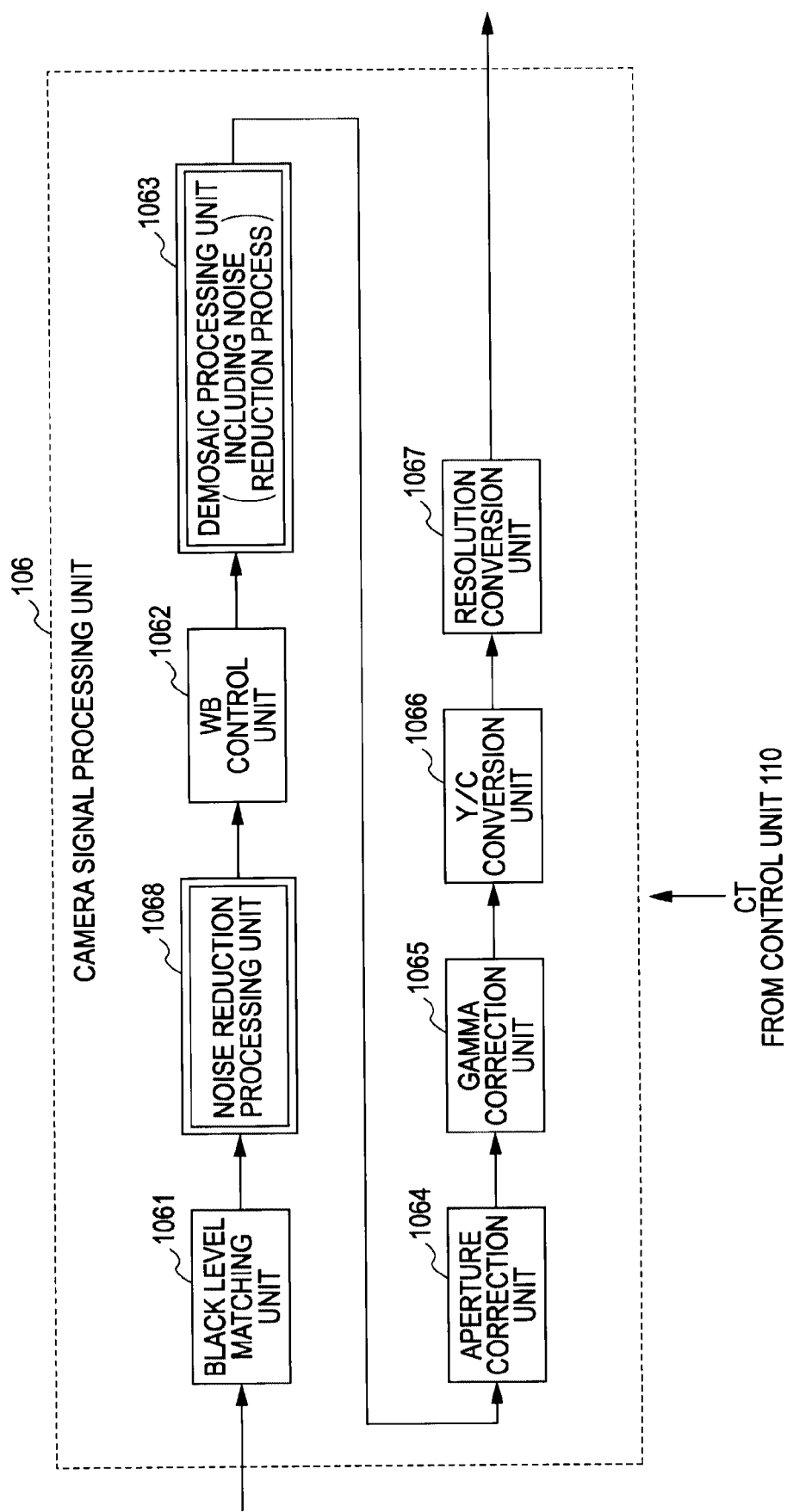
FIG. 23 is a block diagram of another example of the camera signal processing unit.

FIG. 23 is a block diagram of another example of the camera signal processing unit 106. The same numbering will be used in describing FIG. 23 as was utilized above in describing the camera signal processing unit 106 in FIG. 2, and therefore, the detail descriptions thereof are not repeated. As shown in FIG. 23, in addition to a noise reduction process in the demosaic process, a noise reduction process may be added to an appropriate point upstream of the demosaic process as shown by a noise reduction processing unit 1068. In this way, the noise reduction process may be performed together with the color noise reduction process performed by the demosaic processing unit 1063. At that time, since the G signal is processed through a filtering process using the correlation in the demosaic processing unit 1063, it is difficult to separate a noise signal component from a picture signal component.

Accordingly, the noise reduction processing unit 1068 may reduce noise of only the G signal in a raw state while performing no processing on the R and B signals or while performing a slight noise reduction process on the R and B signals.

Third Embodiment

Use of Color Ratio Signal

While the foregoing embodiments have been described with reference to the case where color noise is reduced by performing a noise reduction process on color difference signals (R−G) and (B−G), similar processing can be performed using a color ratio signal in place of a color difference signal. Thus, in a third embodiment described below, a color ratio signal is used in place of a color difference signal. In addition, description of the third embodiment is made when the third embodiment is applied to an image pickup apparatus having the configuration described in FIGS. 1 and 2.

First Exemplary Configuration and Overview of Processing of Demosaic Processing Unit 1063 (Use of Color Ratio Signal)

Figure 24:
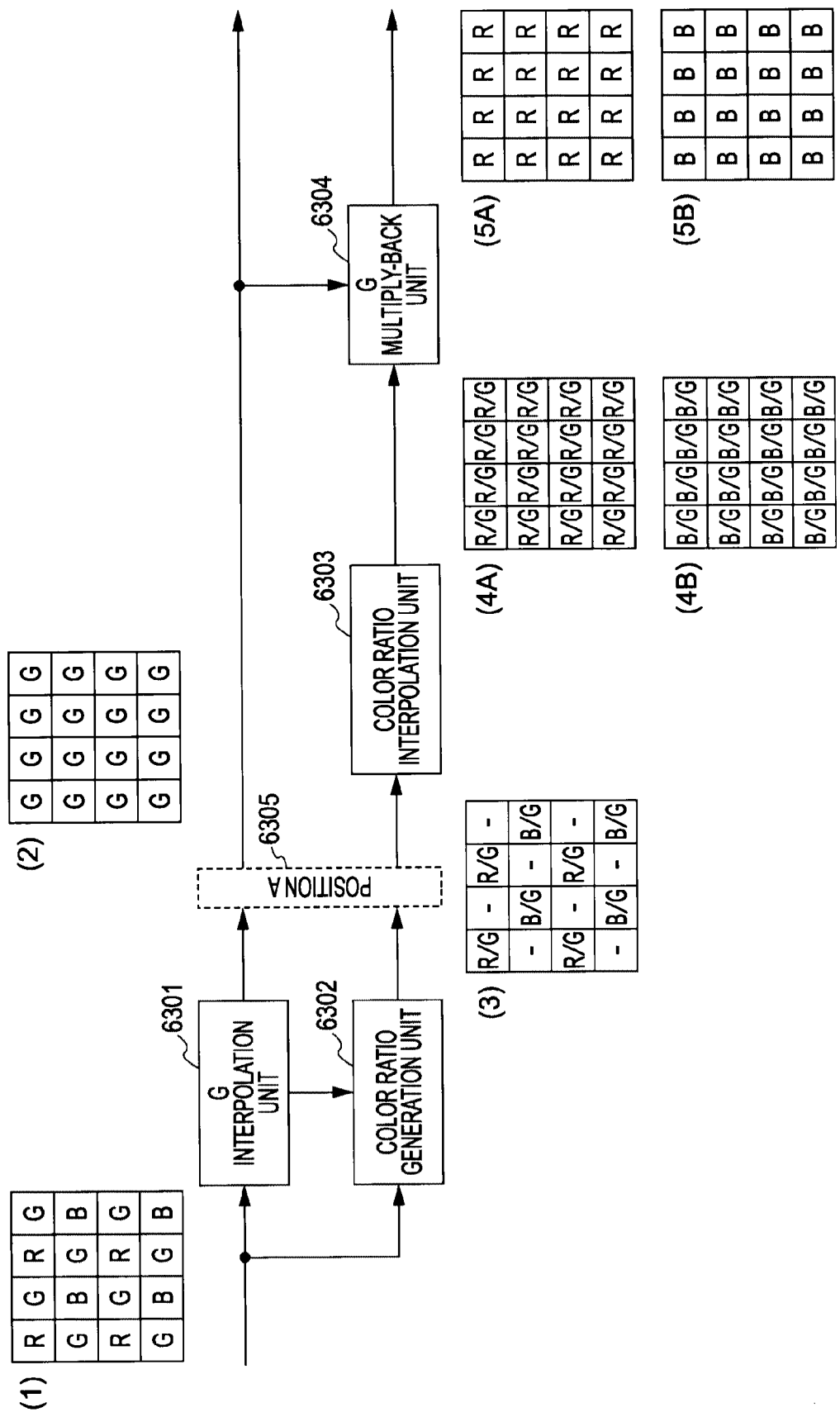
FIG. 24 is a block diagram illustrating a first exemplary configuration and the overview of processing of a demosaic processing unit according to a third embodiment.

FIG. 24 is a block diagram illustrating a first exemplary configuration and the overview of processing of the demosaic processing unit 1063 of the camera signal processing unit 106 shown in FIG. 2 when a color ratio signal is used in place of a color difference signal. That is, FIG. 24 is a block diagram illustrating a first exemplary configuration and the overview of processing of a demosaic processing unit 1063 according to a third embodiment. Description of the third embodiment is made with reference to the case where image data in the Bayer arrangement is processed.

As shown in FIG. 24, the demosaic processing unit 1063 includes a G interpolation unit 6301, a color ratio generation unit 6302, a color ratio interpolation unit 6303, and a G multiply-back unit 6304. In addition, the demosaic processing unit 1063 includes a noise reduction processing unit 6305 disposed at a position A surrounded by a dotted line in FIG. 24, that is, immediately downstream of the G interpolation unit 6301 and the color ratio generation unit 6302.

Image data in the Bayer arrangement, as shown by pattern (1) in FIG. 24, is supplied to the G interpolation unit 6301 and the color ratio generation unit 6302 of the demosaic processing unit 1063 in this example. Subsequently, the G interpolation unit 6301 interpolates the G signal of each of the pixels of an image, as shown by pattern (2) in FIG. 24, on the basis of the G signals of the image data in an arrangement shown by pattern (1) in FIG. 24.

In addition, as shown by pattern (3) in FIG. 24, the color ratio generation unit 6302 generates an R/G signal (a color ratio signal) representing a ratio of the level of an R signal to the level of the G signal for a pixel having the R signal from the image data in an arrangement shown by pattern (1) in FIG. 24. In addition, the color ratio generation unit 6302 generates a B/G signal (a color ratio signal) representing a ratio of the level of a B signal to the level of a G signal for a pixel having the B signal.

Subsequently, the noise reduction processing unit 6305 disposed at the position A in FIG. 24 performs a noise reduction process on the G signal output from the G interpolation unit 6301 and the R/G signal and B/G signal output from the color ratio generation unit 6302, as described below. Thereafter, the R/G signal and B/G signal including reduced noise are supplied to the color ratio interpolation unit 6303.

The color ratio interpolation unit 6303 generates a R/G signal (see pattern (4A) in FIG. 24) and a B/G signal (see pattern (4B) in FIG. 24) for each of the pixels of the image on the basis of color ratio signals shown by pattern (3) in FIG. 24 supplied to the color ratio interpolation unit 6303. The color ratio interpolation unit 6303 then supplies the generated signals to the G multiply-back unit 6304. The G multiply-back unit 6304 multiplies back the R/G signal output from the color ratio interpolation unit 6303 (see pattern (4A) in FIG. 24) and the B/G signal (see pattern (4B) in FIG. 24) by the G signal output from the noise reduction processing unit 6305 described below. Thus, the G multiply-back unit 6304 generates an R signal and a B signal for each of the pixels of the image and, subsequently, outputs the R signal and the B signal. In this way, the demosaic processing unit 1063 shown in FIG. 24 outputs the G signal (see pattern (2) in FIG. 24), the R signal (see pattern (5A) in FIG. 24), and the R signal (see pattern (5B) in FIG. 24) for each of the pixels of the image.
Exemplary Configuration of Noise Reduction Processing Unit 6305

Figure 25:
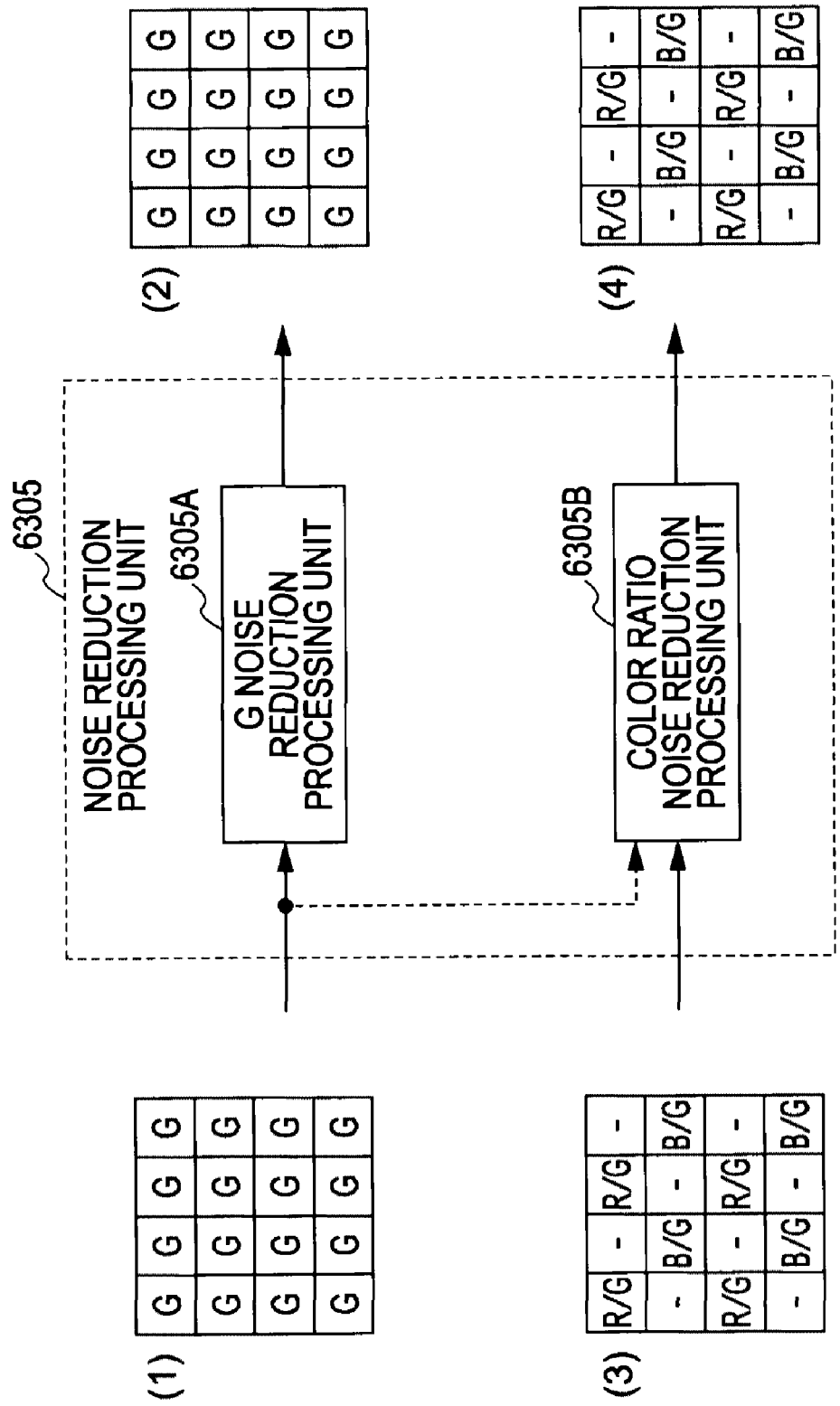
FIG. 25 is a block diagram illustrating an exemplary configuration of a noise reduction processing unit disposed at a position A shown in FIG. 24.

FIG. 25 is a block diagram illustrating an exemplary configuration of the noise reduction processing unit 6305 disposed at the position A shown in FIG. 24. As shown in FIG. 25, the noise reduction processing unit 6305 in this example includes a G noise reduction processing unit 6305A that reduces noise mixed into a G signal and a color ratio noise reduction processing unit 6305B that reduces noise mixed into a color ratio signal.
Overview of Processing Performed by G Noise Reduction Processing Unit 6305A

The G signal of each of the pixels of the image generated through interpolation by the G interpolation unit 6301 (see pattern (1) shown in FIG. 25) is sequentially supplied to the G noise reduction processing unit 6305A. The G noise reduction processing unit 6305A reduces a noise component contained in the G signal using the above-described ε filter and outputs the G signal having reduced noise (see pattern (2) shown in FIG. 25).

Alternatively, in order to reduce noise, the G noise reduction processing unit 6305A may divide the G signal into a high-frequency side (a high-frequency component) and a low-frequency side (a low-frequency component). The G noise reduction processing unit 6305A may then perform a coring process and a limit process on the high-frequency component and perform a process on the low-frequency component using an ε filter. Thus, the G noise reduction processing unit 6305A may perform different noise reduction processes on the high-frequency side and the low-frequency side.

By using this alternative method, even when the level of a picture component is close to the level of a noise component due to low luminance, noise suppression (noise reduction) can be performed without causing an isolated point while maintaining the feature of the picture formed by the processed image signal.

Like the above-described example, in the demosaic processing unit 1063 in this example, in place of performing a noise reduction process in the demosaic processing unit 1063, a noise reduction process of a G signal may be performed before a demosaic process is performed. Alternatively, a noise reduction process may be performed on the Y signal (the luminance signal) subjected to a Y/C conversion performed by the Y/C conversion unit 1066 shown in FIG. 2. That is, the G noise reduction processing unit 6305A shown FIG. 25 is not necessarily provided for the noise reduction processing unit 6305. In order to reduce color noise contained in an image signal efficiently, the presence of the color ratio noise reduction processing unit 6305B is sufficient. The color ratio noise reduction processing unit 6305B is described in more detail below.

Overview of Processing Performed by Color Ratio Noise Reduction Processing Unit 6305B The color ratio signal generated by the color ratio generation unit 6302 (see pattern (3) in FIG. 25) is supplied to the color ratio noise reduction processing unit 6305B. That is, as shown by pattern (3) in FIG. 25, the color ratio generation unit 6302 generates an R/G signal for a pixel having an R signal and a B/G signal for a pixel having a B signal and supplies the generated signals to the color ratio noise reduction processing unit 6305B of the noise reduction processing unit 6305. Subsequently, the color ratio noise reduction processing unit 6305B removes a noise component (a color noise component) contained in the R/G signal and B/G signal using an $\epsilon$ filter for the same color.

However, if the $\epsilon$ filter is applied only on the basis of the color ratio signals R/G and B/G, color bleed may occur in the edge portion of a picture or a color may be missing in the high-frequency portion.

Accordingly, in the color ratio noise reduction processing unit 6305B, when the $\epsilon$ filter is applied, it is determined whether the level difference between a pixel of interest and the surrounding pixel is within a noise threshold value range in terms of the color ratio signals R/G and B/G. In addition, in terms of a G signal, the level difference for a G signal between a pixel of interest and the surrounding pixel from which a color difference signal is obtained. If the level difference for a G signal is within a noise threshold value range, the surrounding pixel becomes the target of the averaging process of the color ratio signals.

In this way, by further using the level of the G signal when a color noise component is removed from the color ratio signal using an $\epsilon$ filter, the color noise component can be accurately removed, and a proper color of the image can be reproduced.

Second Exemplary Configuration and Overview of Processing of Demosaic Processing Unit 1063 (Use of Color Ratio Signal)

Figure 26:
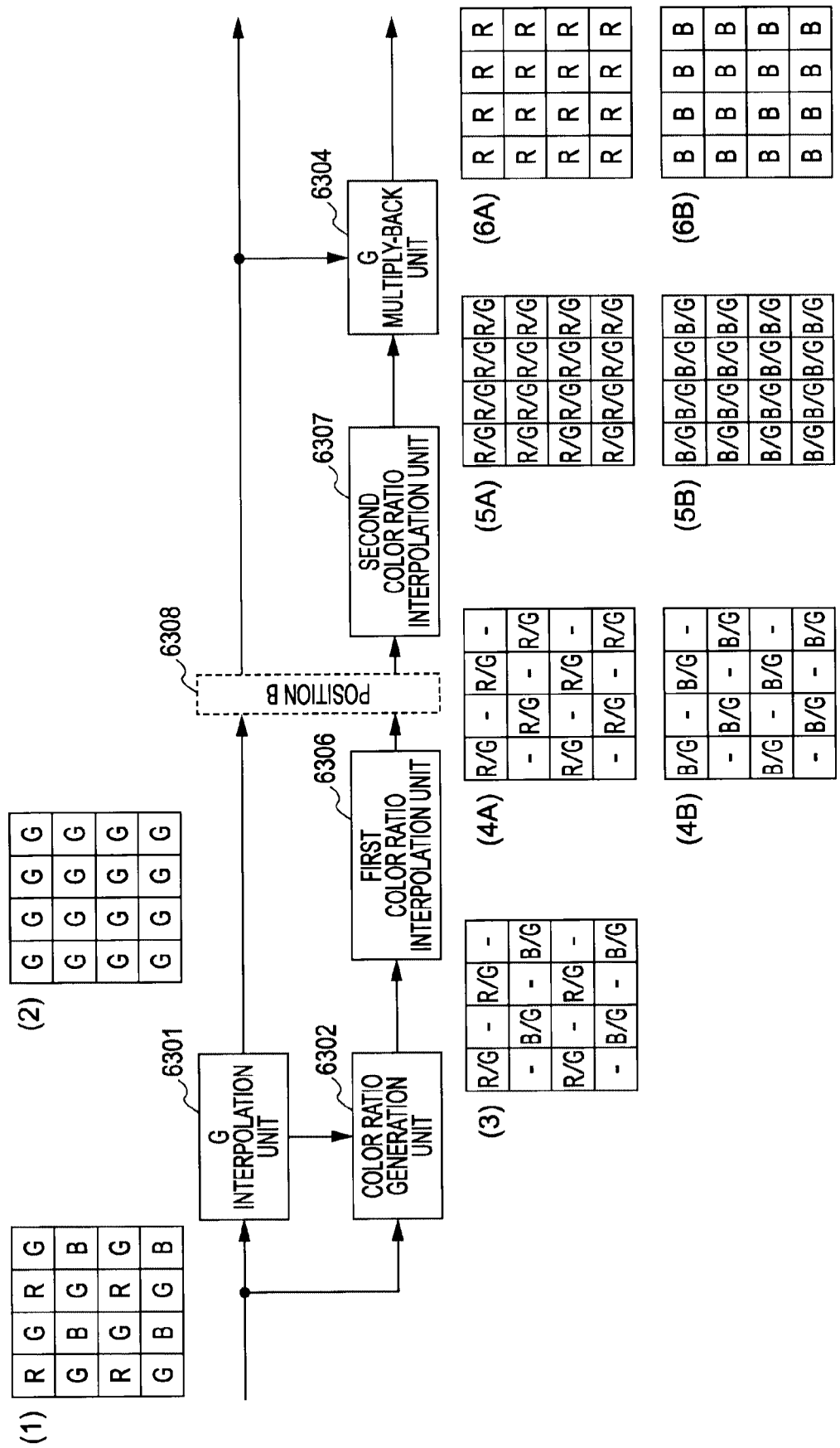
FIG. 26 is a block diagram illustrating a second exemplary configuration and the overview of processing of the demosaic processing unit according to the third embodiment.

FIG. 26 is a block diagram illustrating a second exemplary configuration and the overview of processing of the demosaic processing unit 1063 of the camera signal processing unit 106 shown in FIG. 2 when a color ratio signal is used in place of a color difference signal. That is, FIG. 26 is a block diagram illustrating a second exemplary configuration and the overview of processing of a demosaic processing unit 1063 according to the third embodiment. Here, description is made with reference to the case where image data having the Bayer arrangement is processed.

As shown in FIG. 26, the demosaic processing unit 1063 in this example includes a first color ratio interpolation unit 6306, a second color ratio interpolation unit 6307, and a noise reduction processing unit 6308 disposed between the first color ratio interpolation unit 6306 and the second color ratio interpolation unit 6307. The other configuration is similar to that of the demosaic processing unit 1063 shown in FIG. 24. For simplicity, the same numbering will be used in describing the second demosaic processing unit shown in FIG. 26 as was utilized above in describing the first demosaic processing unit 1063 in FIG. 24, and therefore, the detail descriptions thereof are not repeated.

In addition, in the demosaic processing unit 1063 shown in FIG. 26, the function of the color ratio interpolation unit 6303 of the demosaic processing unit 1063 shown in FIG. 24 is divided into two. That is, the color ratio interpolation function is realized by the first color ratio interpolation unit 6306 and the second color ratio interpolation unit 6307. The color difference generation unit 6302 generates and outputs an R/G signal for a pixel having an R signal and a B/G signal for a pixel having a B signal, as shown by pattern (3) in FIG. 26.

The color ratio signals R/G and B/G generated by the color ratio generation unit 6302 are supplied to the first color ratio interpolation unit 6306. As shown by patterns (4A) and (4B) in FIG. 26, a B/G signal is generated by interpolation for even a pixel for which an R/G signal is generated using surrounding B/G signals. In addition, an R/G signal is generated by interpolation for even a pixel for which a B/G signal is generated by interpolating the surrounding R/G signals.

Subsequently, the second color ratio interpolation unit 6307 interpolates a color ratio signal R/G (see pattern (5A) in FIG. 26) and a color ratio signal B/G (see pattern (5B) in FIG. 26) for a pixel having no color ratio signal from the surrounding pixels having color ratio signals, that is, the color ratio signals generated through interpolation by the first color ratio interpolation unit 6306 (see the patterns (4A) and (4B) in FIG. 26). The subsequent processing performed by the G multiply-back unit 6304 is the same as that described in FIG. 24.

In the demosaic processing unit 1063 having the configuration in which a color ratio interpolation unit is separated into the first color ratio interpolation unit 6306 and the second color ratio interpolation unit 6307, the noise reduction processing unit 6308 is disposed between the first color ratio interpolation unit 6306 and the second color ratio interpolation unit 6307.

Exemplary Configuration of Noise Reduction Processing Unit 6308

Figure 27:
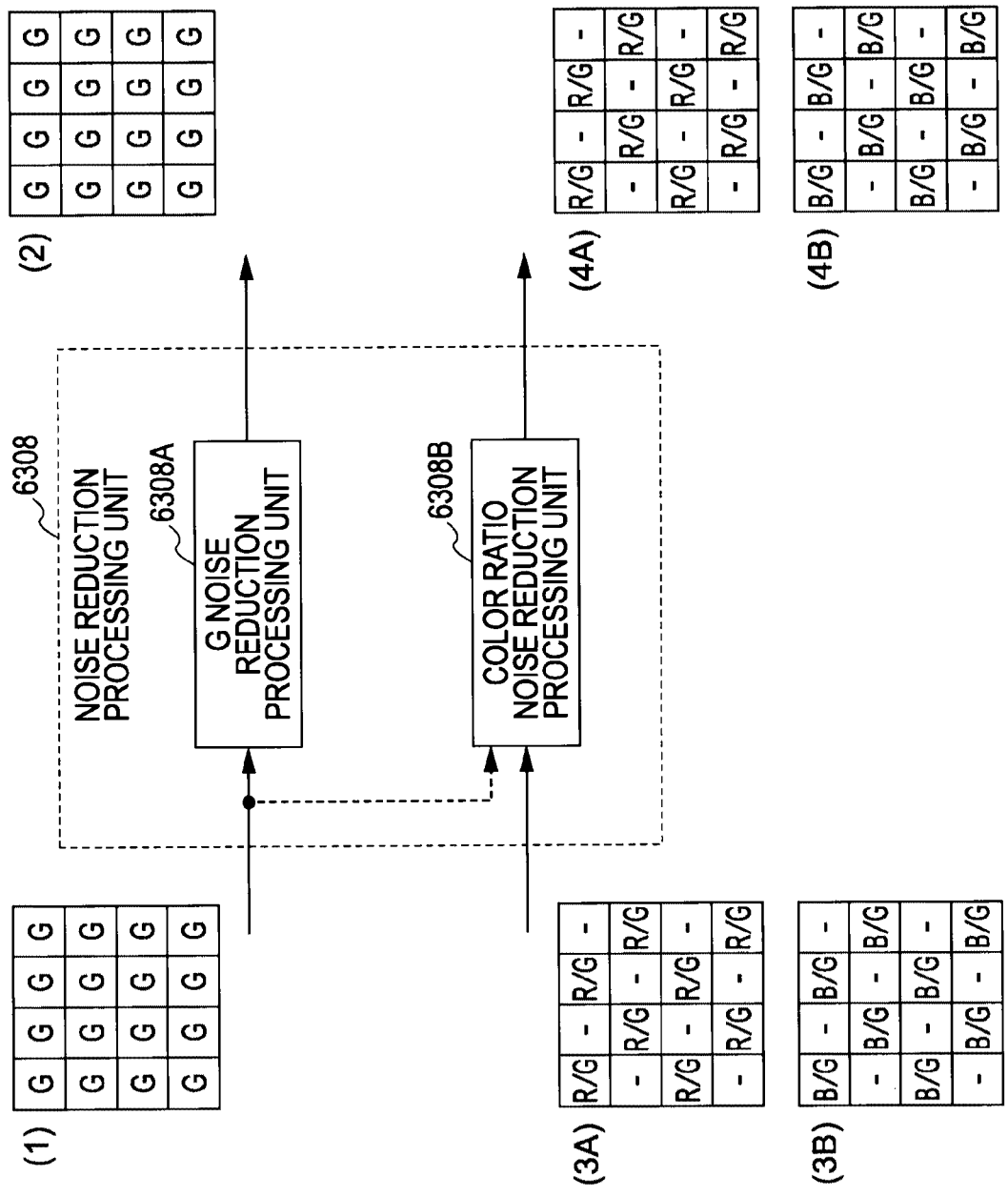
FIG. 27 is a block diagram of an exemplary configuration of the noise reduction processing unit disposed at a position B shown in FIG. 26.

FIG. 27 is a block diagram of an exemplary configuration of the noise reduction processing unit 6308 disposed at the position B shown in FIG. 26. Like the noise reduction processing unit 6305 shown in FIG. 25, the noise reduction processing unit 6308 includes a G noise reduction processing unit 6308A and a color ratio noise reduction processing unit 6308B.

Overview of Processing Performed by G Noise Reduction Processing Unit 6308A

The G noise reduction processing unit 6308A processes G signals having the same form as that in the G noise reduction processing unit 6305A shown in FIG. 25. Accordingly, processing similar to that performed by the G noise reduction processing unit 6305A shown in FIG. 25 is employed. That is, the G noise reduction processing unit 6308A performs a noise reduction process on a G signal using an $\epsilon$ filter. Alternatively, the G noise reduction processing unit 6308A divides a G signal into a high-frequency side (a high-frequency component) and a low-frequency side (a low-frequency component). The G noise reduction processing unit 6308A then performs a coring process and a limit process on the high-frequency component and performs a process on the low-frequency component using an $\epsilon$ filter. Thus, the G noise reduction processing unit 6308A performs different noise reduction processes on the high-frequency side and the low-frequency side.

Overview of Processing Performed by Color Ratio Noise Reduction Processing Unit 6308B Like the color ratio noise reduction processing unit 6305B of the noise reduction processing unit 6305 shown in FIG. 25, the color ratio noise reduction processing unit 6308B performs a color noise reduction process using a color ratio signal. However, the processing is slightly different from the processing performed by the color ratio noise reduction processing unit 6305B shown in FIG. 25, as described below.

That is, in the color ratio noise reduction processing unit 6308B of the noise reduction processing unit 6308 shown in FIG. 27, when reducing noise of an R/G signal, in addition to determining whether the level difference of an R/G signal between a pixel of interest T and the surrounding pixel is within a noise threshold value range, the color ratio noise reduction processing unit 6308B determines whether the level difference of a B/G signal between the pixel of interest T and the surrounding pixel located at the same position as that of the R/G signal is within a noise threshold value range. If the level difference is within the noise threshold value range, the color ratio noise reduction processing unit 6308B selects the surrounding pixel of the R/G signal as a target of the averaging process.

Similarly, when reducing noise of a B/G signal, in addition to determining whether the level difference of a B/G signal between a pixel of interest T and the surrounding pixel is within a noise threshold value range, the color ratio noise reduction processing unit 6308B determines whether the level difference of an R/G signal between the pixel of interest T and the surrounding pixel located at the same position as that of the B/G signal is within a noise threshold value range. If the level difference is within the noise threshold value range, the color ratio noise reduction processing unit 6308B selects the surrounding pixel of the B/G signal as a target of the averaging process.

In this way, as shown by the patterns (4A) and (4B) in FIG. 27, the color ratio signals having reduced color noise can be obtained from the color ratio signals shown by the patterns (3A) and (3B) in FIG. 27.

In order to further accurately reduce the noise by taking into account the edge portion of the picture, the signal level of the G signal is used, as shown by a dotted arrow in FIG. 27.

That is, to reduce the noise of an R/G signal, when the level difference of a B/G signal between the pixel of interest T of the R/G signal and the surrounding signal is within the noise threshold value range and the level difference of a G signal between the pixel of interest of the R/G signal and the surrounding signal is within the noise threshold value range, the surrounding signal of the R/G signal is selected as a target of the averaging process. Similarly, to reduce the noise of a B/G signal, an ϵ filter is applied using the R/G signals and the G signals in addition to the B/G signals.

In this way, as described for the noise reduction processing unit 635 shown in FIG. 7, in processing an edge portion of the picture, a signal component of an unwanted pixel that has a significantly different color can be removed from the targets of a smoothing process, and therefore, color bleed and color missing can be prevented. In addition, while the third embodiment has been described with reference to the case where image data having the Bayer arrangement is processed, the present invention is not limited thereto. For example, as in the third embodiment, a color ratio signal can be used when image data having a Clearvid arrangement is processed.

Summary of Processing Performed by Demosaic Processing Unit

As can be seen from the above-described first to third embodiments, color noise can be effectively reduced in the demosaic processing unit 1063. Two method can be employed in the demosaic processing unit 1063. In a first method, as described in FIGS. 6, 19, and 24, at a location immediately downstream of a location at which a color-related signal, such as a color difference signal or a color ratio signal, is generated, color noise contained in the color difference signal or color ratio signal is reduced.

In a second method, as described in FIGS. 13, 21, and 26, when a color difference signal or a color ratio signal is generated by interpolation for each of the pixels of an image using generated signals related to a color, such as color difference signals or color ratio signals, first interpolation processing and second interpolation processing performed after the first interpolation processing is completed are provided. In the first interpolation processing, for the pixel for which a color difference signal or a color ratio signal has been generated, a color difference signal or a color ratio signal of a different color is generated by interpolation. In the second interpolation processing, a color difference signal or a color ratio signal of a different color is generated by interpolation for each of the pixel of the image. Thus, color noise is reduced from the color difference signal or the color ratio signal subjected to the first interpolation processing.

Hereinafter, a demosaic process using the first method and a demosaic process using the second method are described with reference to flowcharts.

Demosaic Processing According to First Method

Figure 28:
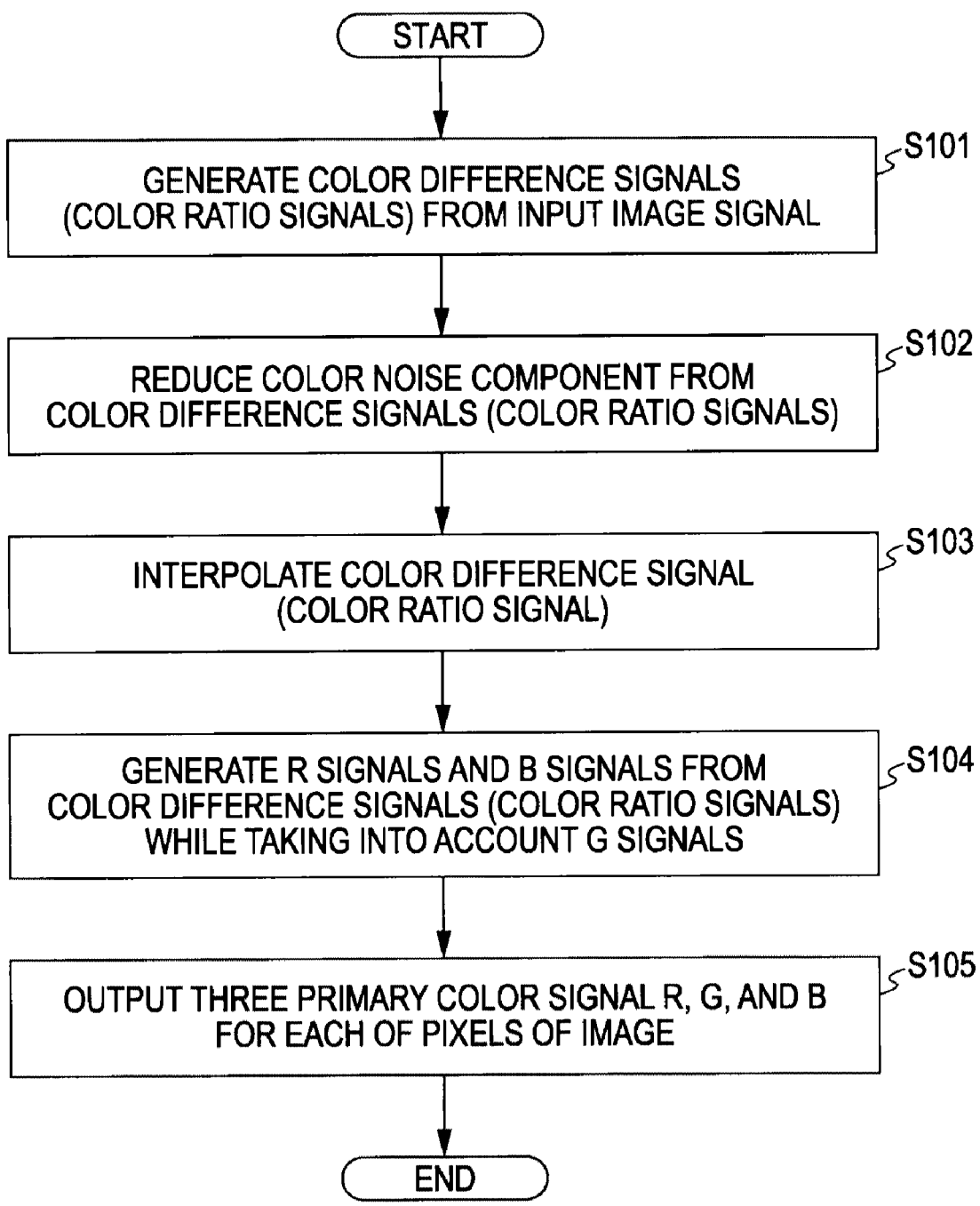
FIG. 28 is a flowchart illustrating a demosaic process performed by a demosaic processing unit shown in FIGS. 6, 19, and 24.

FIG. 28 is a flowchart illustrating a demosaic process using the above-described first method. The processing of the flowchart shown in FIG. 28 is performed by the demosaic processing unit shown in FIGS. 6, 19, and 24. As described above, two types of signal can be used for reducing color noise: a color difference signal and a color ratio signal. The following description is made mainly with reference to a color difference signal. However, the description can be similarly applied to the case where a color ratio signal is used.

When performing a demosaic process, a color difference signal (a color ratio signal), which is a color-related signal, is generated from input image data having a raw data format first (step S101). Subsequently, a predetermined technique, such as an ϵ filter, is applied to the generated color difference signal (the color ratio signal) so that color noise is reduced (step S102).

Thereafter, an interpolation process is performed using the color difference signal (the color ratio signal) having reduced noise. Thus, a color difference signal (a color ratio signal) is generated by interpolation for each of the pixels of an image (step S103). Subsequently, an R signal and a B signal are generated for the color difference signal (the color ratio signal) generated by interpolation for each of the pixels of the image in step S103 while taking into account a G signal (step S104).

That is, when color difference signals (an (R−G) signal and a (B−G) signal) are processed, the G signal is added back in step S104. In contrast, when color ratio signals (an R/G signal and a B/G signal) are processed, the G signal is multiplied back in step S104. Thereafter, by outputting three primary color signals R, G, and B generated for each of the pixels of the image (step S105), the demosaic process is completed.

Although not shown in FIG. 28, the G signal is generated by interpolation for each of the pixels of the image in step S101. As described above, for the G signals, a noise reduction process may or may not be performed.

If, as described above, a color noise reduction process is performed on a color difference signal or a color ratio signal immediately after the color difference signal or color ratio signal is generated, the color difference signal or color ratio signal has no effect of an interpolation process, since the interpolation process has not yet been performed. Accordingly, color noise can be properly reduced.

In addition, the function of the demosaic process according to the embodiments of the present invention can be realized by generating a program in accordance with the flowchart of FIG. 28 and causing a CPU to execute the generated program. That is, the demosaic process according to the embodiments of the present invention can be realized even by software.

Demosaic Processing According to Second Method

Figure 29:
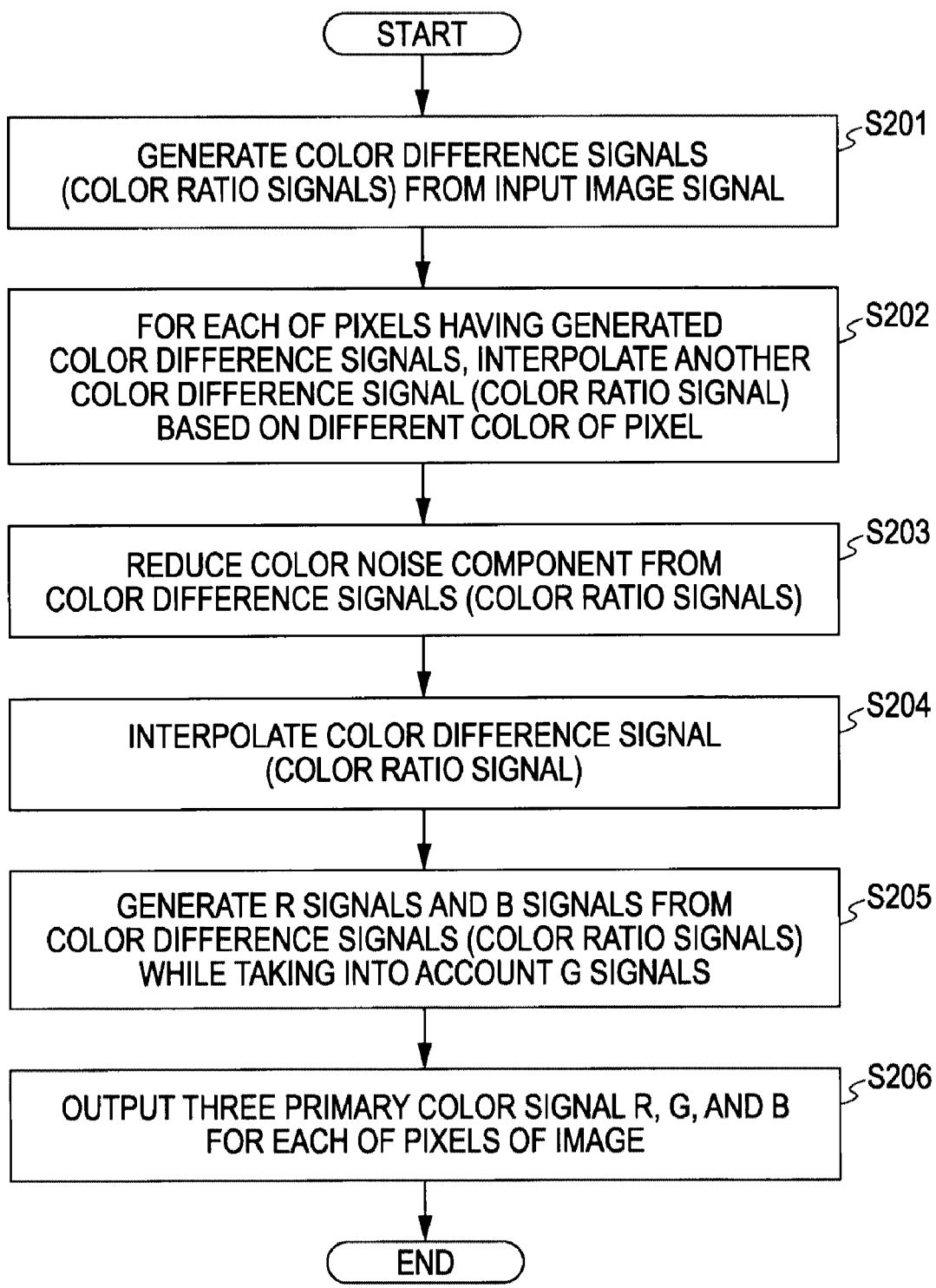
FIG. 29 is a flowchart illustrating a demosaic process performed by a demosaic processing unit shown in FIGS. 13, 21, and 26.

FIG. 29 is a flowchart illustrating a demosaic process using the above-described second method. The processing of the flowchart shown in FIG. 29 is performed by the demosaic processing unit shown in FIGS. 13, 21, and 26. As in the first method, in the second method, two types of signal can be used for reducing color noise: a color difference signal and a color ratio signal. The following description is made mainly with reference to a color difference signal. However, the description can be similarly applied to the case where a color ratio signal is used.

When performing a demosaic process, color difference signals (color ratio signals), which are color-related signals, are generated from input image data having a raw data format first (step S201). Subsequently, for each of the pixels having the generated color difference signals (the color ratio signals), a color difference signal (the color ratio signal) based on a different color is generated by interpolation (step S202).

That is, through the processing performed in step S201, an (R−G) signal (an R/G signal) is generated for a pixel having an R signal, and a (B−G) signal (a B/G signal) is generated for a pixel having a B signal. Therefore, in the processing performed in step S202, a (B−G) signal (a B/G signal) is generated for a pixel having the generated (R−G) signal (the generated R/G signal), and an (R−G) signal (an R/G signal) is generated for a pixel having the generated (B−G) signal (the generated B/G signal). This processing corresponds to the first interpolation process for a color difference signal (a color ratio signal).

Thereafter, in step S203, a color noise reduction process is performed on the color difference signal (the color ratio signal) subjected to the first interpolation process performed using a predetermined method (e.g., an ε filter) in step S202.

Subsequently, by performing an interpolation process using the color difference signals (the color ratio signals) subjected to a color noise reduction process, a color difference signal (a color ratio signal) is generated by interpolation for each of the pixels of the image (step S204). This interpolation process of a color difference signal (a color ratio signal) performed in step S204 corresponds to the second interpolation process.

Thereafter, an R signal and a B signal are generated for the color difference signal (the color ratio signal) generated by interpolation in step S204 for each of the pixels of the image while taking into the G signal of the same pixel (step S205). That is, when color difference signals (an (R−G) signal and a (B−G) signal) are processed, the G signal is added back in step S205. In contrast, when color ratio signals (an R/G signal and a B/G signal) are processed, the G signal is multiplied back in step S205. Thereafter, by outputting three primary color signals R, G, and B generated for each of the pixels of the image (step S206), the demosaic process is completed.

Although not shown in FIG. 29, the G signal is generated by interpolation for each of the pixels of the image in step S201. As described above, for the G signals, a noise reduction process may or may not be performed.

If, as described above, a color noise reduction process is performed on a color difference signal or a color ratio signal after the color difference signal or color ratio signal, which is a color-related signal, is generated, color noise can be accurately reduced by using the (R−G) signal (the R/G signal) and the (B−G) signal (the B/G signal).

In addition, the function of the demosaic process according to the embodiments of the present invention can be realized by generating a program in accordance with the flowchart of FIG. 29 and causing a CPU to execute the generated program. That is, the demosaic process according to the embodiments of the present invention can be realized even by software. Others In the alternative configuration of the noise reduction processing unit 638 according to the first embodiment, as shown in FIG. 16, a G signal and color difference signals (R−G) and (B−G) are converted into the luminance signal Y and the color difference signals Cr and Cb. Thereafter, color noise is reduced from the luminance signal Y and the color difference signals Cr and Cb. Subsequently, the luminance signal Y and the color difference signals Cr and Cb having reduced color noise are converted into a G signal and color difference signals (R−G) and (B−G). However, this processing can be performed by not only the noise reduction processing unit 638 according to the first embodiment but also the noise reduction processing unit 635 according to the first embodiment. Furthermore, this processing can be performed by the noise reduction processing units 635 and 638 according to the second embodiment and the noise reduction processing units 6305 and 6308 according to the third embodiment.

In addition, as described above, the above-described embodiments of the present invention are applicable to a variety of image pickup apparatuses that process image data input through a single-plate solid-state image sensing device, such as a camera module, an image reader, and a scanner mounted in mobile electronic apparatuses (e.g., digital video cameras, digital still cameras, and cell phones). Furthermore, the above-described embodiments of the present invention are applicable to a variety of image pickup apparatuses that process raw data input through a single-plate solid-state image sensing device and stored.

Still furthermore, when the demosaic processing unit 1063 shown by a double line in FIG. 2 is built into an integrated circuit (IC), the above-described embodiments of the present invention are applicable to the demosaic processing unit 1063. In addition, when the camera signal processing unit 106 is built into a circuit block, the above-described embodiments of the present invention are applicable to the mosaic processing unit of the camera signal processing unit 106.

The correspondence between the features of the claims and the specific elements disclosed in the above-described embodiments of the present invention is discussed below. An image sensing device defined in the claims corresponds to the solid-state image sensing device mounted in the image sensing device unit 102 shown in FIG. 1. Demosaic processing means defined in the claims corresponds to one of the demosaic processing units shown in FIGS. 2, 3, 6, 7, 12, 13, 19, 21, 24, and 26.

A generation unit of the demosaic processing means defined in the claims corresponds to the color difference generation unit 632 or the color ratio generation unit 6302 of the demosaic processing unit 1063 in each of the examples. A noise reduction unit defined in the claims corresponds to the noise reduction processing unit 635, 638, 6305, or 6308 of the demosaic processing unit 1063 in each of the examples. A target color signal defined in the claims corresponds to an R signal or a B signal. A predetermined other color signal defined in the claims corresponds to a G signal. A first interpolation unit defined in the claims corresponds to the first color difference interpolation unit 636 or the first color ratio interpolation unit 6306. A second interpolation unit defined in the claims corresponds to the second color difference interpolation unit 637 or the second color ratio interpolation unit 6307.

The term "color-related signal" used in the claims collectively refers to a color difference signal and a color ratio signal. A conversion unit defined in the claims corresponds to the Y/C conversion unit 6383. A reverse conversion unit defined in the claims corresponds to the reverse Y/C conversion unit 6386.

While the foregoing embodiments have been described with reference to three primary color signals R (red), G (green), and B (blue), the present invention is not limited thereto. In recent years, image pickup apparatuses using a signal of an emerald color in addition to the signals of the three primary colors have been developed. The above-described embodiments of the present invention are applicable to even such image pickup apparatuses.

That is, the embodiments of the present invention can be realized by performing computation using at least a target color signal and a predetermined other signal and performing a color noise reduction process on a color-related signal, such as a color difference signal or a color ratio signal, that associates the target color signal with the predetermined other color signal.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image sensing device including a color filter having pixels of a plurality of different colors arranged in a predetermined order, the image sensing device receiving an image of a subject and outputting an image signal; and
   demosaic processing means for generating color signals for each pixel of the image based on the image signal, which is received from the image sensing device,
   wherein the demosaic processing means includes a generation unit, a color difference interpolation unit, and a noise reduction unit, the generation unit performs computation using an interpolated signal representing a predetermined target color included in the image signal received from the image sensing device so as to generate a color-related signal for a pixel of the predetermined target color, that associates the interpolated signal and a signal corresponding to a second predetermined color that is different from the predetermined target color,
   the noise reduction unit performs a noise reduction process on the color-related signal generated by the generation unit such that a related color noise characteristic is the same as that of the image signal received from the image sensing device, and
   the color difference interpolation unit interpolates the noise-reduced signal after the noise reduction process is performed.

2. The image pickup apparatus according to claim 1, wherein a plurality of types of target color signal are defined, wherein the demosaic processing means further includes a first interpolation unit, wherein, using the color-related signal output from the generation unit, the first interpolation unit generates, for each of the pixels of each type of target color signal, a color-related signal that uses a different type of target color signal and outputs the generated color-related signals together with the color-related signal output from the generation unit, and the color difference interpolation unit generates, for each of the pixels of the image, a plurality of types of color-related signals based on the plurality of color-related signals output from the first interpolation unit, and wherein the noise reduction unit is disposed between the first interpolation unit and the color difference interpolation unit, and the noise reduction unit performs the noise reduction process on the color-related signals output from the first interpolation unit and supplies the color-related signals to the color difference interpolation unit.

3. The image pickup apparatus according to claim 1 or 2, wherein the noise reduction unit performs the noise reduction process on the color-related signal based on the signal corresponding to the second predetermined color.

4. The image pickup apparatus according to claim 1 or 2, wherein the noise reduction unit includes conversion means for converting the color-related signal into a different color-related signal having a different format and reverse conversion means for converting the different color-related signal back to the color-related signal in an original format, and wherein the noise reduction unit performs the noise reduction process on the different color-related signal converted by the conversion means, converts the different color-related signal back to the color-related signal in the original format using the reverse conversion means, and outputs the color-related signal.

5. The image pickup apparatus according to claim 1 or 2, wherein the color-related signal represents a difference between a level of the interpolated signal and a level of the signal corresponding to the second predetermined color.

6. The image pickup apparatus according to claim 1 or 2, wherein the color-related signal represents a color ratio signal of a level of the interpolated signal to a level of the signal corresponding to the second predetermined color.

7. A method for reducing color noise for use in demosaic processing performed on an image signal received from an image sensing device so as to generate color signals of different colors for each pixel of an image, the image sensing device including a color filter having pixels of a plurality of different colors arranged in a predetermined order, the image sensing device receiving the image, of a subject, and outputting the image signal, the method including the steps of:
   (a) performing computation using an interpolated signal representing a predetermined target color included in the image signal received from the image sensing device and a signal corresponding to a second predetermined color that is different from the predetermined target color so as to generate a color-related signal for a pixel of the predetermined target color, that associates the interpolated signal with the signal corresponding to the second predetermined color;
   (b) performing a noise reduction process on the color-related signal such that a related color noise characteristic is the same as that of the image signal received from the image sensing device; and
   (c) interpolating the noise-reduced signal after the noise reduction is performed.

8. The method according to claim 7, wherein a plurality of types of target color signal are defined, and wherein the method further including: (d) generating, for each of the pixels of each type of target color signal, a color-related signal that uses a different type of target color signal so as to output the generated color-related signals together with the color-related signal output in step (a), and interpolating the noise-reduced signal in step (c) includes generating, for each of the pixels of the image, a plurality of types of color-related signals based on the plurality of color-related signals output in step (d), wherein step (b) is performed between step (c) and step (d), and the noise reduction process is performed on the color-related signals output in step (d).

9. A non-transitory computer-readable storage medium having computer readable program codes embodied in the computer readable storage medium that, when executed cause an image pickup apparatus, the image pickup apparatus including an image sensing device including a color filter having pixels of a plurality of different colors arranged in a predetermined order, the image sensing device receiving an image of a subject and outputting an image signal, the image pickup apparatus performing demosaic processing on the image signal received from the image sensing device so as to generate a color-related signal:

(a) performing computation using an interpolated signal representing a predetermined target color included in the image signal received from the image sensing device and a signal corresponding to a second predetermined color that is different from the predetermined target color so as to generate a color-related signal for a pixel of the predetermined target color, that associates the interpolated signal with the signal corresponding to the second predetermined color;

(b) performing a noise reduction process on the color-related signal generated in step (a) such that a related color noise characteristic is the same as that of the image signal received from the image sensing device; and (c) interpolating the noise-reduced signal after the noise reduction is performed.

10. The non-transitory computer-readable storage medium according to claim 9, wherein a plurality of types of target color signal are defined, and wherein the method further including: (d) generating, for each of the pixels of each type of target color signal, a color-related signal that uses a different type of target color signal so as to output the generated color-related signals together with the color-related signal output in step (a), and interpolating the noise-reduced signal in step (c) includes generating, for each of the pixels of the image, a plurality of types of color-related signals using the plurality of color-related signals output in step (d), wherein step (b) is performed between step (c) and step (d), and the noise reduction process is performed on the color-related signals output in step (d).

11. An image pickup apparatus comprising:

an image sensing device including a color filter having pixels of a plurality of different colors arranged in a predetermined order, the image sensing device receiving an image of a subject and outputting an image signal; and a demosaic processing unit configured to generate color signals for each pixel of the image based on the image signal, which is received from the image sensing device;

wherein the demosaic processing unit includes a generation unit, a color difference interpolation unit and a noise reduction unit, the generation unit performs computation using an interpolated signal representing a predetermined target color included in the image signal received from the image sensing device so as to generate a color-related signal for a pixel of the predetermined target color, that associates the interpolated signal and a signal corresponding to a second predetermined color that is different from the predetermined target color, the noise reduction unit performs a noise reduction process on the color-related signal generated by the generation unit, such that a related color noise characteristic is the same as that of the image signal received from the image sensing device, and the color difference interpolation unit interpolates the noise-reduced signal after the noise reduction process is performed.

12. The image pickup apparatus according to claim 1, wherein the demosaic processing means generates the color-related signal without using parts of the image signal, outputted by the image sensing device, corresponding to the second predetermined color.

\* \* \* \* \*